(12) United States Patent
Zeng et al.

(10) Patent No.: US 11,955,654 B2
(45) Date of Patent: Apr. 9, 2024

(54) BATTERY, AND RELATED DEVICE, PREPARATION METHOD AND PREPARATION APPARATUS THEREOF

(71) Applicant: CONTEMPORARY AMPEREX TECHNOLOGY CO., LIMITED, Fujian (CN)

(72) Inventors: Yuqun Zeng, Fujian (CN); Pengcheng Yao, Fujian (CN); Zhimin Zeng, Fujian (CN); Kai Wu, Fujian (CN); Xingdi Chen, Fujian (CN); Peng Wang, Fujian (CN); Xiaobo Chen, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 75 days.

(21) Appl. No.: 17/123,092

(22) Filed: Dec. 15, 2020

(65) Prior Publication Data
US 2022/0013849 A1 Jan. 13, 2022

Related U.S. Application Data

(63) Continuation of application No. PCT/CN2020/101440, filed on Jul. 10, 2020.

(51) Int. Cl.
*H01M 50/30* (2021.01)
*H01M 10/42* (2006.01)
(Continued)

(52) U.S. Cl.
CPC ........... *H01M 50/30* (2021.01); *H01M 10/42* (2013.01); *H01M 10/613* (2015.04);
(Continued)

(58) Field of Classification Search
CPC .. H01M 50/30; H01M 50/249; H01M 50/271; H01M 50/618; H01M 10/613;
(Continued)

(56) References Cited

U.S. PATENT DOCUMENTS

| 8,105,708 B2 | 1/2012 | Rudorff et al. |
| 8,147,998 B2 | 4/2012 | Yeo |

(Continued)

FOREIGN PATENT DOCUMENTS

| CN | 101160689 A | 4/2008 |
| CN | 101385187 A | 3/2009 |

(Continued)

OTHER PUBLICATIONS

First Office Action dated Oct. 9, 2022 received in Chinese Patent Application No. CN 202080005847.2.

(Continued)

*Primary Examiner* — Jimmy Vo
(74) *Attorney, Agent, or Firm* — Scully, Scott, Murphy & Presser, P.C.

(57) ABSTRACT

The present application discloses a battery, and a related device, preparation apparatus thereof. The battery includes a battery cell, the battery cell including a pressure relief mechanism and at least two walls, the at least two walls including a first wall and a second wall that intersect with each other, the pressure relief mechanism being disposed at the first wall and being configured to, when an internal pressure or temperature of the battery cell reaches a threshold, be actuated to release the internal pressure; a thermal management component attached to the first wall and being configured to accommodate a fluid to cool the battery cell; and a support component attached to the second wall, and configured to support the battery cell; wherein the thermal management component is configured such that when the (Continued)

pressure relief mechanism is actuated, emissions discharged from the battery cell pass through the thermal management component.

18 Claims, 9 Drawing Sheets

(51) Int. Cl.
    *H01M 10/613*     (2014.01)
    *H01M 10/647*     (2014.01)
    *H01M 10/6567*     (2014.01)
    *H01M 50/249*     (2021.01)
    *H01M 50/271*     (2021.01)
    *H01M 50/618*     (2021.01)
    *H01M 10/0525*     (2010.01)

(52) U.S. Cl.
    CPC ..... *H01M 10/647* (2015.04); *H01M 10/6567* (2015.04); *H01M 50/249* (2021.01); *H01M 50/271* (2021.01); *H01M 50/618* (2021.01); *H01M 10/0525* (2013.01)

(58) Field of Classification Search
    CPC ........... H01M 10/647; H01M 10/6567; H01M 10/42; H01M 10/0525
    See application file for complete search history.

(56) References Cited

U.S. PATENT DOCUMENTS

| | | | |
|---|---|---|---|
| 8,758,923 | B2 | 6/2014 | Yoon et al. |
| 9,595,705 | B1* | 3/2017 | Buckhout ............. H01M 50/20 |
| 10,476,115 | B2 | 11/2019 | Smith et al. |
| 11,450,916 | B2 | 9/2022 | Chen et al. |
| 11,631,919 | B2 | 4/2023 | Wu et al. |
| 11,791,518 | B2 | 10/2023 | Zeng et al. |
| 2009/0075158 | A1 | 3/2009 | Rudorff et al. |
| 2009/0159354 | A1 | 6/2009 | Jiang et al. |
| 2009/0181288 | A1 | 7/2009 | Sato |
| 2009/0220850 | A1 | 9/2009 | Bitsche et al. |
| 2009/0305114 | A1 | 12/2009 | Yeo |
| 2009/0305116 | A1 | 12/2009 | Yang et al. |
| 2010/0136391 | A1 | 6/2010 | Prilutsky et al. |
| 2011/0135994 | A1 | 6/2011 | Yang et al. |
| 2011/0293974 | A1 | 12/2011 | Yoon et al. |
| 2012/0114993 | A1* | 5/2012 | Park ................... H01M 50/325 429/88 |
| 2012/0164490 | A1* | 6/2012 | Itoi .................... H01M 50/502 429/82 |
| 2013/0011719 | A1* | 1/2013 | Yasui ................... H01M 50/35 429/159 |
| 2013/0059175 | A1 | 3/2013 | Engel et al. |
| 2013/0095356 | A1 | 4/2013 | Shimizu et al. |
| 2013/0240220 | A1 | 9/2013 | Loureiro et al. |
| 2015/0162648 | A1 | 6/2015 | Yang et al. |
| 2015/0214525 | A1* | 7/2015 | Lim .................. H01M 10/0413 429/53 |
| 2016/0293926 | A1 | 10/2016 | Yamada |
| 2017/0040653 | A1 | 2/2017 | Morris et al. |
| 2017/0170439 | A1 | 6/2017 | Jarvis et al. |
| 2017/0279169 | A1 | 9/2017 | Obrist et al. |
| 2017/0301965 | A1 | 10/2017 | Kato et al. |
| 2018/0047959 | A1 | 2/2018 | Kruger |
| 2018/0212208 | A1 | 7/2018 | Kim |
| 2018/0351219 | A1 | 12/2018 | Smith et al. |
| 2019/0173074 | A1 | 6/2019 | Ogawa et al. |
| 2019/0181419 | A1 | 6/2019 | Suba et al. |
| 2019/0207184 | A1 | 7/2019 | Koutari et al. |
| 2019/0229384 | A1 | 7/2019 | Tasiopoulos et al. |
| 2019/0273243 | A1 | 9/2019 | Motokawa et al. |
| 2020/0083575 | A1 | 3/2020 | Yoo et al. |
| 2020/0136110 | A1 | 4/2020 | Koutari et al. |
| 2020/0152941 | A1* | 5/2020 | Wynn ................... H01M 50/20 |
| 2020/0194819 | A1 | 6/2020 | Aikata et al. |
| 2020/0212526 | A1 | 7/2020 | Wu et al. |
| 2020/0251703 | A1 | 8/2020 | Aldrich |
| 2021/0104801 | A1 | 4/2021 | Chu et al. |
| 2021/0135319 | A1 | 5/2021 | You et al. |
| 2021/0296721 | A1 | 9/2021 | Omura et al. |
| 2022/0013755 | A1 | 1/2022 | Chen et al. |
| 2022/0013757 | A1 | 1/2022 | Wu et al. |
| 2022/0013849 | A1 | 1/2022 | Zeng et al. |
| 2022/0013853 | A1 | 1/2022 | Zeng et al. |
| 2022/0013854 | A1 | 1/2022 | Liang et al. |
| 2022/0069411 | A1 | 3/2022 | Wakabayashi et al. |

FOREIGN PATENT DOCUMENTS

| | | |
|---|---|---|
| CN | 101483227 A | 7/2009 |
| CN | 101604759 A | 12/2009 |
| CN | 102598358 A | 7/2012 |
| CN | 103123996 A | 5/2013 |
| CN | 103460469 A | 12/2013 |
| CN | 203589111 U | 5/2014 |
| CN | 104956513 A | 9/2015 |
| CN | 205488300 U | 8/2016 |
| CN | 106784489 A | 5/2017 |
| CN | 106785182 A | 5/2017 |
| CN | 206301865 U | 7/2017 |
| CN | 206401400 U | 8/2017 |
| CN | 207097998 U | 3/2018 |
| CN | 208256764 U | 12/2018 |
| CN | 208298909 U | 12/2018 |
| CN | 110061329 A | 7/2019 |
| CN | 209071461 U | 7/2019 |
| CN | 209104274 U | 7/2019 |
| CN | 110165104 A | 8/2019 |
| CN | 110199406 A | 9/2019 |
| CN | 110277533 A | 9/2019 |
| CN | 209401662 U | 9/2019 |
| CN | 209626294 U | 11/2019 |
| CN | 209804781 U | 12/2019 |
| CN | 209822772 U | 12/2019 |
| CN | 110707260 A | 1/2020 |
| CN | 210129540 U | 3/2020 |
| CN | 111106277 A | 5/2020 |
| CN | 210467893 U | 5/2020 |
| CN | 210576161 U | 5/2020 |
| CN | 210576163 U | 5/2020 |
| CN | 111384324 A | 7/2020 |
| CN | 211376746 U | 8/2020 |
| CN | 213026308 U | 4/2021 |
| CN | 213026309 U | 4/2021 |
| CN | 213584016 U | 6/2021 |
| CN | 213601965 U | 7/2021 |
| CN | 114175363 A | 3/2022 |
| CN | 114175365 A | 3/2022 |
| CN | 114175377 A | 3/2022 |
| CN | 114175378 A | 3/2022 |
| CN | 114175381 A | 3/2022 |
| CN | 114258611 A | 3/2022 |
| DE | 102014001352 A1 | 8/2015 |
| DE | 102017212223 A1 | 1/2019 |
| EP | 2804188 A1 | 11/2014 |
| EP | 2359432 B1 | 8/2018 |
| EP | 3675218 A1 | 7/2020 |
| EP | 3796412 A1 | 3/2021 |
| JP | 2007-027011 A | 2/2007 |
| JP | 2009164085 A | 7/2009 |
| JP | 2009534811 A | 9/2009 |
| JP | 2013509688 A | 3/2013 |
| JP | 2014132585 A | 7/2014 |
| JP | 2014160573 A | 9/2014 |
| JP | 2015018706 A | 1/2015 |
| JP | 2018067387 A | 4/2018 |
| JP | 2019029245 A | 2/2019 |
| JP | 2019091628 A | 6/2019 |
| JP | 2019129149 A | 8/2019 |
| KR | 20100081942 A | 7/2010 |
| KR | 20160066909 A | 6/2016 |
| KR | 101799540 B1 | 11/2017 |
| KR | 20180104567 A | 9/2018 |

(56) References Cited

FOREIGN PATENT DOCUMENTS

| | | | |
|---|---|---|---|
| KR | 20190089121 | A | 7/2019 |
| RU | 60792 | U1 | 1/2007 |
| RU | 2636059 | C2 | 11/2017 |
| RU | 2675595 | C1 | 12/2018 |
| RU | 186666 | U1 | 1/2019 |
| RU | 2721432 | C2 | 5/2020 |
| WO | 2013006121 | A1 | 1/2013 |
| WO | 2013034225 | A1 | 3/2013 |
| WO | 2015045404 | A1 | 4/2015 |
| WO | 2018/234207 | A1 | 12/2018 |
| WO | 2020/026973 | A1 | 2/2020 |
| WO | 2020133745 | A1 | 7/2020 |
| WO | 2020133751 | A1 | 7/2020 |
| WO | 2021008875 | A1 | 1/2021 |

OTHER PUBLICATIONS

Office Action dated Oct. 21, 2022 received in U.S. Appl. No. 17/113,038.
Office Action dated Dec. 22, 2022 received in U.S. Appl. No. 15/734,449.
Notice of Reasons for Refusal dated Jan. 16, 2023 received in Japanese Patent Application No. JP 2021-576383.
Notice of Reasons for Refusal dated Jan. 30, 2023 received in Japanese Patent Application No. JP 2021-578107.
Notice of Reasons for Refusal dated Jan. 30, 2023 received in Japanese Patent Application No. JP 2021-578156.
Examination Report dated Mar. 2, 2023 received in Indian Patent Application No. IN 202117059130.
Office Action dated Mar. 14, 2023 received in European Patent Application No. EP 20811946.1.
Extended European Search Report dated Aug. 1, 2023 received in European Patent Application No. EP 23171327.2.
Notice of Reasons for Refusal dated Jul. 18, 2023 received in Japanese Patent Application No. JP 2022-538852.
Office Action dated Jul. 11, 2023 received in Russian Patent Application No. RU 2023101396/07(002924).
Notice of Reasons for Refusal dated Aug. 21, 2023 received in Japanese Patent Application No. JP 2022-534435.
First Office Action dated Sep. 4, 2023 received in Chinese Patent Application No. CN 202080005840.0.
First Office Action dated Aug. 31, 2023 received in Chinese Patent Application No. CN 202080005840.2.
First Office Action dated Jul. 14, 2023 received in Chinese Patent Application No. CN 202080005870.1.
Office Action dated Jul. 4, 2023 received in Canadian patent Application No. CA 3,156,564.
Office Action dated Aug. 3, 2023 received in Russian Patent Application No. RU 2023100981/07(002034).
Office Action dated Jul. 21, 2023 received in Russian Patent Application No. RU 2023101348/07(002853).
Office Action dated Jul. 11, 2023 received in Russian Patent Application No. RU 2023101521/07(003151).
Office Action dated Jul. 11, 2023 received in Russian Patent Application No. RU 2023101397/07(002925).
Grant a Patent for an Invention dated Mar. 14, 2023 received in Russian Patent Application No. RU 2023100798/07(001576).
Office Action dated Jun. 1, 2023 received in U.S. Appl. No. 15/734,449.
Office Action dated Jun. 7, 2023 received in U.S. Appl. No. 17/113,042.
Extended European Search Report dated Feb. 14, 2024 received in European Patent Application No. EP 23204083.2.
Notice of Preliminary Rejection dated Jan. 31, 2024 received in Korean Patent Application No. KR 10-2021-7043325.
Notice of Allowance dated Feb. 8, 2024 received in Korean Patent Application No. KR 10-2021-7042848.
Office Action dated Dec. 14, 2023 received in U.S. Appl. No. 15/734,449.
Notice of Registration and Grant of Patent for Invention dated Dec. 1, 2023 received in Chinese Patent Application No. CN 202080005840.0.
Notice of Registration and Grant of Patent for Invention dated Nov. 28, 2023 received in Chinese Patent Application No. CN 202080005854.2.

* cited by examiner

BATTERY, AND RELATED DEVICE, PREPARATION METHOD AND PREPARATION APPARATUS THEREOF

CROSS-REFERENCE TO RELATED APPLICATIONS

This application is a continuation of International Application No. PCT/CN2020/101440, filed on Jul. 10, 2020, which is hereby incorporated by reference in its entirety.

TECHNICAL FIELD

The present application relates to the field of batteries, and in particular to a battery, and a related device, preparation method and preparation apparatus thereof.

BACKGROUND

A chemical battery, an electrochemistry-based battery, an electrochemical battery or an electrochemical cell is a kind of device that converts the chemical energy of positive and negative electrode active materials into electric energy through a redox reaction. Different from an ordinary redox reaction, oxidation and reduction reactions are carried out separately, with oxidation at a negative electrode and reduction at a positive electrode, while electron gains and losses are carried out through an external circuit, thus forming a current. This is the essential characteristic of all batteries. After a long period of research and development, the chemical battery usher in the situation of a wide variety of applications, with a device being large enough to fit into a building, and small enough to be measured in millimeters. With the development of modern electronic technology, high requirements are put forward for the chemical battery. Every breakthrough in the chemical battery technology has brought a revolutionary development of electronic devices. Many electrochemical scientists around the world are interested in developing chemical batteries to power electric vehicles.

A lithium-ion battery, as a kind of chemical battery, has the advantages of a small volume, a high energy density, a high power density, a great number of times of cycle use, and long storage time, etc., and has been widely used in some electronic devices, electric transportation means, electronic toys and electric equipment. For example, the lithium-ion batteries are widely used in mobile phones, laptops, electromobiles, electric vehicles, electric airplanes, electric ships, electronic toy vehicles, electronic toy ships, electronic toy airplanes, electric tools, etc.

With the continuous development of the lithium-ion battery technology, higher requirements have been put forward for the performance of the lithium-ion battery. It is desirable that many design factors can be considered for the lithium-ion battery at the same time, among which the safety performance of the lithium-ion battery is particularly important.

SUMMARY

The present application provides a battery, and a related device, preparation method and preparation apparatus thereof, which could improve the safety performance and compactness of the battery.

According to a first aspect of the present application, a battery is provided, the battery including: a battery cell, the battery cell including a pressure relief mechanism and at least two walls, the at least two walls including a first wall and a second wall that intersect with each other, the pressure relief mechanism being disposed at the first wall, and the pressure relief mechanism being configured to, when an internal pressure or a temperature of the battery cell reaches a threshold, be actuated to release the internal pressure; a thermal management component attached to the first wall, the thermal management component being configured to accommodate a fluid to adjust the temperature of the battery cell; and a support component attached to the second wall, and configured to support the battery cell; wherein the thermal management component is configured such that when the pressure relief mechanism is actuated, emissions discharged from the battery cell pass through the thermal management component.

Through this arrangement of the pressure relief mechanism, the thermal management component and the support component, no matter whether the battery cell is arranged vertically, laterally, horizontally or upside down in the battery, the support component, the thermal management component and the pressure relief mechanism are arranged on two intersecting wall surfaces of the battery cell, which will provide flexibility in the space occupied by the battery that the prior art does not have. The space occupied by the pressure relief mechanism, the thermal management component and the support component is dispersed in two different dimensions or directions. This can help to improve, e.g., a space utilization rate of batteries suitable for being arranged in vehicles, thereby helping to improve the compactness of the battery structure and improve the energy density of the batteries in the vehicles. Besides, through the cooperation of the thermal management component and the pressure relief mechanism, this design also helps to make use of timely internal pressure relief to improve the safety of batteries.

In some embodiments, the battery cell further includes: a housing, the housing including an accommodating chamber formed by a bottom wall and side walls and an opening capable of approaching the accommodating chamber; and a cover plate, the cover plate being suitable for closing the opening; wherein the first wall includes the cover plate or at least one of the side walls, and the second wall is the bottom wall. This design of the battery cell with the housing having the accommodating chamber provided with the opening and the cover plate suitable for closing the opening facilitates installation or disassembly of the battery cell, helps to reduce maintenance costs and provide a certain flexibility in the arrangement of the battery cell.

In some embodiments, the battery further includes a case, the case including a cover body and a case shell, and the case shell and the cover body jointly forming an electrical chamber for accommodating the battery cell in an enclosing manner, wherein the support component is a portion of the case shell or is arranged on an inner side of the case shell. The case shell and the cover body can provide a space for accommodating a plurality of battery cells and provide reliable protection for the battery cells.

In some embodiments, the case further includes a beam extending between the cover body and the case shell which are arranged opposite each other, and the thermal management component is arranged between the beam and the first wall. This arrangement can fully improve the space utilization rate, thereby making the battery structure more compact.

In some embodiments, the thermal management component and the support component form an integral structure. The support component and the thermal management component which are integrally formed can help to improve the structural strength of the battery.

In some embodiments, the thermal management component is provided with a through hole, and the through hole is configured to allow the emissions discharged from the battery cell to pass through the thermal management component. Through the through hole formed in the thermal management component, in the case of thermal runaway inside the battery, it can be ensured that emissions from the battery cell can be discharged outward via the through hole as soon as possible to pass through the thermal management component, and the risk caused by unsmooth discharge of the emissions can be reduced. In addition, by means of the through hole, the emissions from the battery cell can be discharged out of the battery more quickly through the through hole, thereby reducing the risk of secondary high voltage caused by blocked discharge and improving the safety performance of the battery.

In some embodiments, the thermal management component is configured to be capable of being damaged by the emissions discharged from the battery cell, so that the emissions discharged from the battery cell can pass through the thermal management component. Through the structure of the thermal management component, in the case of thermal runaway inside the battery, it is ensured that emissions from the battery cell are effectively discharged, so that the risk caused by unsmooth discharge of the emissions is reduced, and the safety of the battery in the case of thermal runaway inside the battery is improved.

In some embodiments, the thermal management component is configured to be capable of being damaged by the emissions discharged from the battery cell, so that the fluid flows out from interior of the thermal management component. Through this arrangement, the high-temperature and high-pressure emissions from the battery cell can be effectively cooled or subjected to temperature adjustment in other appropriate ways as early as possible, thereby helping to improve the safety performance of the battery.

In some embodiments, the thermal management component further includes an avoidance structure, the avoidance structure being configured to be capable of providing a space allowing the pressure relief mechanism to be actuated, wherein the thermal management component is attached to the battery cell to form an avoidance chamber between the avoidance structure and the pressure relief mechanism. The provision of the avoidance structure can ensure that the pressure relief mechanism can be effectively actuated. In addition, the avoidance chamber can provide a buffer space for the emissions from the battery cell, thereby reducing the impact force of the emissions from the battery cell on the outside and further improving the safety performance of the battery.

In some embodiments, the avoidance structure includes a bottom avoidance wall and a side avoidance wall surrounding the avoidance chamber, and the bottom avoidance wall is configured to be damaged when the pressure relief mechanism is actuated, so as to allow the emissions to pass through the thermal management component. This arrangement achieves, in a simple manner and at low cost, the purpose of allowing the emissions to pass through the thermal management component when the pressure relief mechanism is actuated.

In some embodiments, the bottom avoidance wall includes a partial relief mechanism, and the partial relief mechanism is configured to, when the pressure relief mechanism is actuated, be actuated to allow at least emissions from the battery cell to be discharged through the thermal management component. Through this arrangement, the purpose of making the emissions pass through the thermal management component when the pressure relief mechanism is actuated is achieved in a simple way and at a lower cost, and the internal space of the battery cell is sealed to a certain extent under normal use conditions (for example, when no thermal runaway occurs in the battery cell).

In some embodiments, the side avoidance wall forms a predetermined angle with respect to the bottom avoidance wall, and the predetermined angle is between 105° and 175°. The avoidance structure arranged in this way is easy to manufacture, and also helps the side avoidance wall to be damaged by the emissions from the battery cell, so that the fluid can flow out quickly to help cool the emissions, thereby improving the safety performance of the battery.

In some embodiments, the side avoidance wall is configured to be damaged when the pressure relief mechanism is actuated, so that the fluid flows out. This arrangement enables the fluid to flow out at a low cost and in a simple way, so that the temperature of the emissions from the battery cell can be adjusted or affected in time by using the fluid of the battery itself, for example, the temperature of the emissions from the battery cell can be rapidly reduced, thereby further improving the safety performance of the battery.

In some embodiments, the battery further includes a collection chamber, the collection chamber being arranged on the other side of the thermal management component with respect to the pressure relief mechanism, and being configured to collect the emissions when the pressure relief mechanism is actuated. The arrangement of the collection chamber can provide further buffering for the emissions to further reduce the impact force of the emissions. In addition, the collection chamber also helps to reduce the risk of secondary damage that the emissions may cause to external components or external structures.

In some embodiments, the beam has a hollow space, and the hollow space constitutes the collection chamber. This arrangement can further increase the space utilization.

In some embodiments, the support component further includes an additional collection chamber, and the additional collection chamber and the collection chamber are operably communicated with each other at a lower portion or bottom of the collection chamber. The arrangement of the additional collection chamber can provide further buffering for the emissions to further reduce the impact force of the emissions, and provide a larger space for temporarily accommodating the emissions before the emissions are discharged out of the battery.

In some embodiments, a diversion structure is arranged in the collection chamber, and the diversion structure is configured to be capable of being favorable for guiding the emissions to a predetermined position. This arrangement helps to more efficiently guide the emissions to the additional collection chamber as soon as possible, or discharge the emissions out of the battery more safely via the additional collection chamber, so as to avoid other safety risks caused by the emissions accumulated in the collection chamber.

In some embodiments, the fluid is a cooling medium, and the thermal management component is configured to accommodate the cooling medium to cool the battery cell. The battery cell is cooled by using the cooling medium, so that the battery cell can be in a lower temperature and safer operating state, which helps to improve the safety performance of the battery.

According to a second aspect of the present application, a device is provided. The device includes a battery described in the first aspect above, the battery being configured to provide electrical energy for the device.

According to a third aspect of the present application, a method for preparing a battery is further provided, the method including: providing a plurality of battery cells, at least one of the plurality of battery cells including: at least two walls, the at least two walls including a first wall and a second wall that intersect with each other; and a pressure relief mechanism, the pressure relief mechanism being disposed at the first wall, and the pressure relief mechanism being configured to, when an internal pressure or a temperature of the battery cell reaches a threshold, be actuated to release the internal pressure; and providing a thermal management component, and attaching the thermal management component to the first wall, the thermal management component being configured to accommodate a fluid to adjust the temperature of the battery cell, and being configured such that when the pressure relief mechanism is actuated, emissions discharged from the battery cell pass through the thermal management component; and providing a support component, and attaching the support component to the second wall to support the battery cell.

In some embodiments, the method further includes: providing a case, the case including a cover body and a case shell, and the case shell and the cover body jointly forming an electrical chamber for accommodating the battery cell in an enclosing manner; and providing the support component on an inner side of the case shell, or using a portion of the case shell as the support component.

In some embodiments, the case further includes a beam extending between the cover body and the case shell which are arranged opposite each other. Moreover, providing the thermal management component includes arranging the thermal management component between the beam and the first wall.

According to a fourth aspect of the present application, an apparatus for preparing a battery is provided, the apparatus including: a battery cell preparation module, configured to prepare a plurality of battery cells, at least one of the plurality of battery cells including a pressure relief mechanism and at least two walls, the at least two walls including a first wall and a second wall that intersect with each other, the pressure relief mechanism being disposed at the first wall, and the pressure relief mechanism being configured to, when an internal pressure or temperature of the battery cell reaches a threshold, be actuated to release the internal pressure; a thermal management component preparation module, configured to prepare a thermal management component, the thermal management component being configured to accommodate a fluid to adjust the temperature of the battery cell, and being configured such that when the pressure relief mechanism is actuated, emissions discharged from the battery cell pass through the thermal management component; a support component preparation module, configured to prepare a support component, the support component being configured to support the battery cell; and an assembly module, configured to attach the thermal management component to the first wall and attach the support component to the second wall.

BRIEF DESCRIPTION OF THE DRAWINGS

The accompanying drawings described herein are intended to provide a further understanding of the present application, which constitute a part of the present application. Illustrative embodiments of the present application and the description thereof are for explaining the present application and do not constitute an undue limitation of the present application. In the drawings.

DESCRIPTION OF EMBODIMENTS

Figure 1:
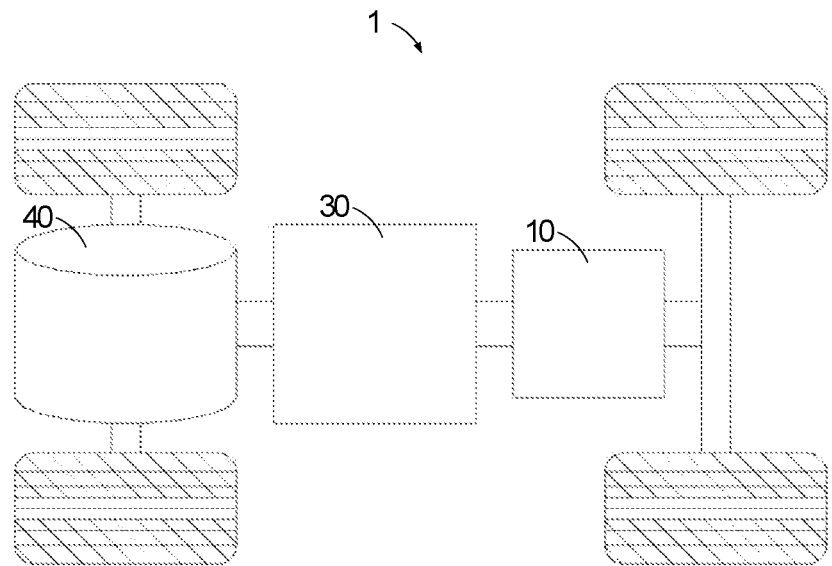
FIG. 1 shows a schematic structural diagram of some embodiments of a vehicle using a battery of the present application.

In order to make the objects, technical solutions and advantages of the present application clearer, the technical solutions in the embodiments of the present application will be clearly and completely described below with reference to accompanying drawings which show various embodiments of the present application. It should be understood that the described embodiments are merely some of, rather than all of, the embodiments of the present application. All the other embodiments obtained by a person of ordinary skill in the art based on the embodiments specified in the present application without involving any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprise", "include", "have", "with", "involve", "contain" and the like in the specification and the claims of the present application as well as the description of the above drawings are open-ended terms. Therefore, a method or device, "comprising", "including", or "having", for example, one or more steps or elements, has one or more steps or elements, but is not limited to only having the one or more elements. The terms "first", "second" and the like in the specification and the claims of the present application as well as the above drawings are used to distinguish different objects, rather than to describe a specific order or primary-secondary relationship. In addition, the terms "first" and "second" are merely used for description and shall not be construed as indicating or implying relative importance or implicitly indicating the number of the indicated technical features. Thus, the features defined by the terms "first" and "second" can explicitly or implicitly include one or more features. In the description of the present application, the meaning of "a plurality of" is two or more, unless otherwise indicated.

In the description of the present application, it should be understood that the orientation or positional relationships indicated by the terms "center", "transverse", "length", "width", "upper", "lower", "front"; "rear", "left", "right", "vertical", "horizontal", "top", "bottom", "inside", "outside", "axial direction", "radial direction", "circumferential direction", etc. are based on the orientation or positional relationship shown in the accompanying drawings and are only for facilitating the description of the present application and simplifying the description, rather than indicating or implying that the device or element referred to must have a particular orientation or be constructed and operated in a particular orientation, and therefore will not be interpreted as limiting the present application.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

The phrase "embodiments" referred to in the present application means that the descriptions of specific features, structures, and characteristics in combination with the embodiments are comprised in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

As mentioned above, it should be emphasized that when the term "comprise/include" is used in this specification, it is used to clearly indicate the presence of stated features, integers, steps or assemblies, but does not preclude the presence or addition of one or more other features, integers, steps, components or groups thereof. As used in the present application, the singular forms "a", "an" and "the" also include plural forms, unless otherwise clearly indicated in the context.

The terms "a" and "an" in this specification may mean one, but may also be consistent with the meaning of "at least one" or "one or more". The term "about" generally means the mentioned value plus or minus 10%, or more specifically plus or minus 5%. The term "or" used in the claims means "and/or" unless it is clearly stated that it only refers to an alternative solution.

In the present application, the term "and/or" is merely an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

A battery mentioned in this field may be grouped into primary battery and rechargeable battery according to whether it is rechargeable. Primary battery is commonly known as "disposable" battery and galvanic cell, because it cannot be recharged and can only be discarded after its power is exhausted. Rechargeable battery is also called secondary battery, secondary cell or storage battery. Manufacturing material and process of the rechargeable battery is different from the primary battery. The rechargeable battery has the advantages that it can be recycled multiple times after being charged, and the output current load capacity of the rechargeable battery is higher than that of most primary batteries. At present, the common types of rechargeable battery are: lead-acid battery, nickel-metal hydride battery and lithium-ion battery. The lithium-ion battery has the advantages of having a light weight, a large capacity (the capacity is 1.5 to 2 times that of the nickel-metal hydride battery of the same weight), no memory effect, etc., and has a very low self-discharge rate, so it is still widely used even if the price thereof is relatively high. Lithium-ion battery is also used in battery electric vehicle and hybrid vehicle. The capacity of the lithium-ion battery used for this purpose is relatively low, but the lithium-ion battery has relatively large output and charging current, and some have relatively long service life, but the cost is relatively high.

The battery described in the embodiments of the present application refers to a rechargeable battery. In the following, a lithium-ion battery will be taken as an example to describe the embodiments disclosed in the present application. It should be understood that the embodiments disclosed in the present application are applicable to any other suitable types of rechargeable batteries. The battery mentioned in the embodiments of the present application refers to a single physical module including one or more battery cells to provide a higher voltage and capacity. For example, the battery mentioned in the present application may include a battery module or a battery pack, etc. The battery mentioned in the embodiments disclosed in the present application can be directly or indirectly applied to an appropriate device to power the device. The battery cell may generally be grouped into three types according to the way of packaging: cylindrical battery cell, prismatic battery cell and pouch battery cell. The following will mainly focus on the prismatic battery cell. It should be understood that the embodiments described hereinafter are also applicable to cylindrical battery cell or pouch battery cell in at least some aspects.

In some high-power application scenarios such as electric vehicles, the application of the battery includes three levels: battery cell, battery module and battery pack. The battery module is formed by electrically connecting a certain number of battery cells together and putting them into a frame to protect the battery cells from external impact, heat, vibration, etc. The battery pack is the final state of a battery system installed into the electric vehicle. Most of the current battery packs are made by assembling various control and protection systems such as a battery management system (BMS) and a thermal management component on one or more battery modules. With the development of technology in the field of battery, the level of battery module can be omitted. That is, the battery pack may be directly formed from battery cells. This improvement allows the battery system to increase the gravimetric energy density and the volumetric energy density while significantly reducing the number of parts. The battery mentioned in the present application includes a battery module or a battery pack.

The operation of the lithium-ion battery cell mainly relies on the movement of lithium ions between a positive electrode sheet and a negative electrode sheet. The lithium-ion battery cell uses an embedded lithium compound as an electrode material. Currently, the main common positive electrode materials used for the lithium-ion battery are: lithium cobalt oxide (LiCoO2), lithium manganate (LiMn2O4), lithium nickelate (LiNiO2) and lithium iron phosphate (LiFePO4). An isolation film is arranged between the positive electrode sheet and the negative electrode sheet to form a thin-film structure with three layers of material. The thin-film structure is generally made into an electrode assembly with a desired shape by means of coiling or stacking. For example, the thin-film structure of three layers of material in a cylindrical battery cell is coiled into a cylindrical electrode assembly, while the thin-film structure in a prismatic battery cell is coiled or stacked into an electrode assembly having a substantially cuboid shape.

With respect to battery cell, the main safety hazards come from the charging and discharging processes, and a suitable environmental temperature design is also required. In order to effectively avoid unnecessary losses, at least triple protection measures are generally taken for the battery cell. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing lithium ions from passing through the isolation film and terminating the internal reaction of the battery.

The pressure relief mechanism refers to an element or component that can be actuated when an internal pressure or internal temperature of a battery cell reaches a predetermined threshold so as to release the internal pressure and/or internal substances. The pressure relief mechanism specifically may take the form of an anti-explosion valve, an air valve, a pressure relief valve or a safety valve, etc., and may specifically use a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for releasing the internal pressure. The threshold referred to in the present application may be a pressure threshold or a temperature threshold, and the design of the threshold varies according to different design requirements. For example, the threshold may be designed or determined according to the value of an internal pressure or internal temperature of a battery cell that is considered to be in danger or at the risk of out-of-control. Furthermore, the threshold may depend on, for example, the material of one or more of the positive electrode sheet, the negative electrode sheet, the electrolytic solution and the isolation film in the battery cell.

The "actuation" mentioned in the present application means that the pressure relief mechanism acts or is activated to release the internal pressure or substances of the battery cell. The generated action may include but is not limited to: at least a portion of the pressure relief mechanism being fractured, torn, broken or opened, etc. When the pressure relief mechanism is actuated, high-temperature and high-pressure substances inside the battery cell are discharged outward from an actuated position as emissions. In this way, under the condition of controllable pressure or temperature, the pressure or emissions from the battery cell can be released, thus avoiding more serious accidents. The emissions from the battery cell mentioned in the present application include but are not limited to: the electrolytic solution, the dissolved or split positive and negative electrode sheets, fragments of the isolation film, high-temperature and high-pressure gas generated by reaction, and/or flame, etc. Generally, the high-temperature and high-pressure emissions are discharged in a direction of the pressure relief mechanism provided in the battery cell, have great strength and destructive power, and may even break through one or more structures such as a cover body arranged in this direction.

The conventional pressure relief mechanism is generally arranged on a cover plate at the top of or above the battery cell, that is, on the same side as an electrode terminal on the cover plate, while a support component is generally arranged on one side opposite the cover plate, that is, the support component is usually attached to a bottom wall or bottom of a housing. The support component referred to in the present application can be understood as a component for providing a support function or a gravity resisting function, so the support component may generally be understood as a component attached to the bottom wall or bottom of the housing to support or fix the battery cell thereon.

In addition, this method of arranging the pressure relief mechanism and the support component on two mutually opposite surfaces/walls/portions of the battery cell has been applied in the field of batteries for many years, and has its rationality of existence. Specifically, for the box of the battery cell, the cover plate is machined separately, which has a flat-plate-like structure, and the pressure relief mechanism can be firmly installed or formed on the cover plate by means of a simple and appropriate process. In contrast, arranging the pressure relief mechanism separately on the housing of the battery cell may use more complicated processes and bring about higher costs. Besides, supporting the battery cell from the bottom is also an implementation with a relatively low manufacturing difficulty.

In addition, for the conventional pressure relief mechanism, a certain amount of avoidance space is required during actuation. The avoidance space refers to the space inside or outside the pressure relief mechanism in the actuation direction (i.e., the torn direction) when the pressure relief mechanism is actuated (for example, at least a portion of the pressure relief mechanism is torn). In other words, the avoidance space is the space that allows the pressure relief mechanism to be actuated. Since the cover plate has a thicker thickness than the housing, it is easier to form an avoidance space when the pressure relief mechanism is provided on the cover plate, thereby facilitating the design and manufacture of the battery cells. Specifically, the housing of the battery cell is formed by stamping an aluminum sheet. Compared with the cover plate, the wall thickness of the stamped housing is very thin. On the one hand, the relatively thin wall thickness of the housing makes it difficult to provide the pressure relief mechanism that requires an avoidance space on the housing. On the other hand, the one-piece concave structure of the housing makes it difficult to mount the pressure relief mechanism on the housing, which will also increase the cost of the battery cell.

In addition, arranging the pressure relief mechanism in a place other than on the cover plate at the top of or above the battery cell also has a serious problem that the pressure relief mechanism is more easily eroded by the electrolytic solution in the housing. In these years during which the rechargeable battery industry is booming, battery manufacturers have comprehensively considered costs and various other factors, and a pressure relief mechanism of a battery cell, especially of a power battery cell, is basically arranged on the cover plate above the battery cell. That is, the pressure relief mechanism and the electrode terminal of the battery cell are arranged on the same side. This has also become a design concept that battery designers have long upheld when designing batteries.

However, this design concept held by battery designers for a long time also has some shortcomings. For example, if the pressure relief mechanism is arranged on the cover plate on the battery cell and a supporting structure is arranged at the bottom of the battery cell opposite the cover plate, this design will inevitably results in that the space required for the design of the pressure relief mechanism and the supporting structure mainly occurs in the same dimension or direction. Typically, the space is occupied in a substantially vertical direction or height direction. Because this space occupation in this direction is inevitable and difficult to reduce, it greatly limits the design space of the structural design of a vehicle using this kind of battery or battery pack. Besides, this design may also have the problem that the emission from the battery cell burns through all the structures above the battery cell, thereby endangering the safety of people in a cab.

Generally, it is necessary to change the design concept that the pressure relief mechanism is arranged on the cover plate and the support component is arranged at the bottom opposite the cover plate, so that the pressure relief mechanism and the support component are arranged relative to two opposite walls of the battery cell. This requires researchers and those skilled in the art to solve various technical problems and overcome certain technical prejudice or design concepts held by the industry for a long time, which cannot be accomplished in an action.

In order to solve or at least partially solve the above problems and other potential problems of the batteries in the prior art, the inventors of the present application went the other way and propose a new battery after conducting a lot of research and experiments.

For example, devices to which the batteries described in the embodiments of the present application are applicable include but are not limited to: mobile phones, portable devices, laptops, electromobiles, electric vehicles, ships, spacecrafts, electronic toys, electric tools, etc. For example, the spacecrafts include airplanes, rockets, space shuttles, spaceships, etc. The electronic toys include fixed or mobile electronic toys, such as game consoles, electric vehicle toys, electric ship toys, electric airplane toys, etc. The electric tools include metal cutting power tools, grinding power tools, assembly power tools and railway power tools, such as electric drills, electric grinders, electric wrenches, electric screwdrivers, electric hammers, electric impact drills, concrete vibrators and electric planers.

The battery described in the embodiments of the present application is applicable not only to the foregoing devices, but also to all devices using batteries. However, for the sake of brevity, the following embodiments take electric vehicles as an example for description.

For example, FIG. 1 shows a simple schematic diagram of a vehicle 1 according to an embodiment of the present application. The vehicle 1 may be a fuel vehicle, a gas vehicle or a new-energy vehicle, and the new-energy vehicle may be a battery electric vehicle, a hybrid vehicle or an extended-range vehicle, or the like. As shown in FIG. 1, a battery 10 may be provided inside the vehicle 1. For example, the battery 10 may be disposed at the bottom or the head or the tail of the vehicle 1. The battery 10 may be configured to supply power to the vehicle 1. For example, the battery 10 may be used as an operation power supply of the vehicle 1. Moreover, the vehicle 1 may also include a controller 30 and a motor 40. The controller 30 is used to control the battery 10 to supply power to the motor 40, for example, for a working power demand of the vehicle 1 during startup, navigation and running. In another embodiment of the present application, the battery 10 can be used not only as an operation power supply of the vehicle 1, but also as a driving power supply of the vehicle 1, replacing or partially replacing fuel or natural gas to provide driving power for the vehicle 1. The battery 10 referred to hereinafter may also be understood as a battery pack including a plurality of battery cells 20.

As shown in FIGS. 2-5, the battery cell 20 includes a box 21, an electrode assembly 22 and an electrolytic solution. The electrode assembly 22 is accommodated in the box 21 of the battery cell 20, and the electrode assembly 22 includes a positive electrode sheet, a negative electrode sheet and an isolation film. The material of the isolation film may be PP or PE, etc. The electrode assembly 22 may have a coiled structure or a laminated structure. The box 21 may include a housing 211 and a cover plate 212. The housing 211 includes an accommodating chamber 211a formed by a plurality of walls, and an opening 211b. The cover plate 212 is arranged at the opening 211b to close the accommodating chamber 211a. In addition to the electrode assembly 22, the electrolytic solution is also accommodated in the accommodating chamber 211a. The positive electrode sheet and the negative electrode sheet in the electrode assembly 22 are generally provided with electrode tabs, and the electrode tab generally includes a positive electrode tab and a negative electrode tab. Specifically, the positive electrode sheet includes a positive electrode current collector and a positive electrode active material layer. The positive electrode active material layer is coated on a surface of the positive electrode current collector, and the positive electrode current collector not coated with the positive electrode active material layer protrudes from the positive electrode current collector coated with the positive electrode active material layer and is used as a positive electrode tab. The material of the positive electrode current collector may be aluminum, and the positive electrode active material may be lithium cobalt oxides, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the negative electrode current collector not coated with the negative electrode active material layer protrudes from the negative electrode current collector coated with the negative electrode active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. The positive electrode tab and the negative electrode tab may be electrically connected to a positive electrode terminal 214a and a negative electrode terminal 214b located outside the battery cell 20, respectively, through connecting members 23. With respect to a prismatic battery cell, the positive electrode terminal 214a and the negative electrode terminal 214b may generally be disposed on the cover plate 212. A plurality of battery cells 20 are connected together in series and/or parallel via positive electrode terminals 214a and negative electrode terminals 214b for various application scenarios.

It can be understood that although in the embodiments shown in FIGS. 2-5, the housing 211 has one opening 211b, in other embodiments, the housing 211 may also have two openings 211b arranged oppositely, and cover plates 212 are arranged at the two openings 211b respectively to close the accommodating chamber 211a.

Figure 6:
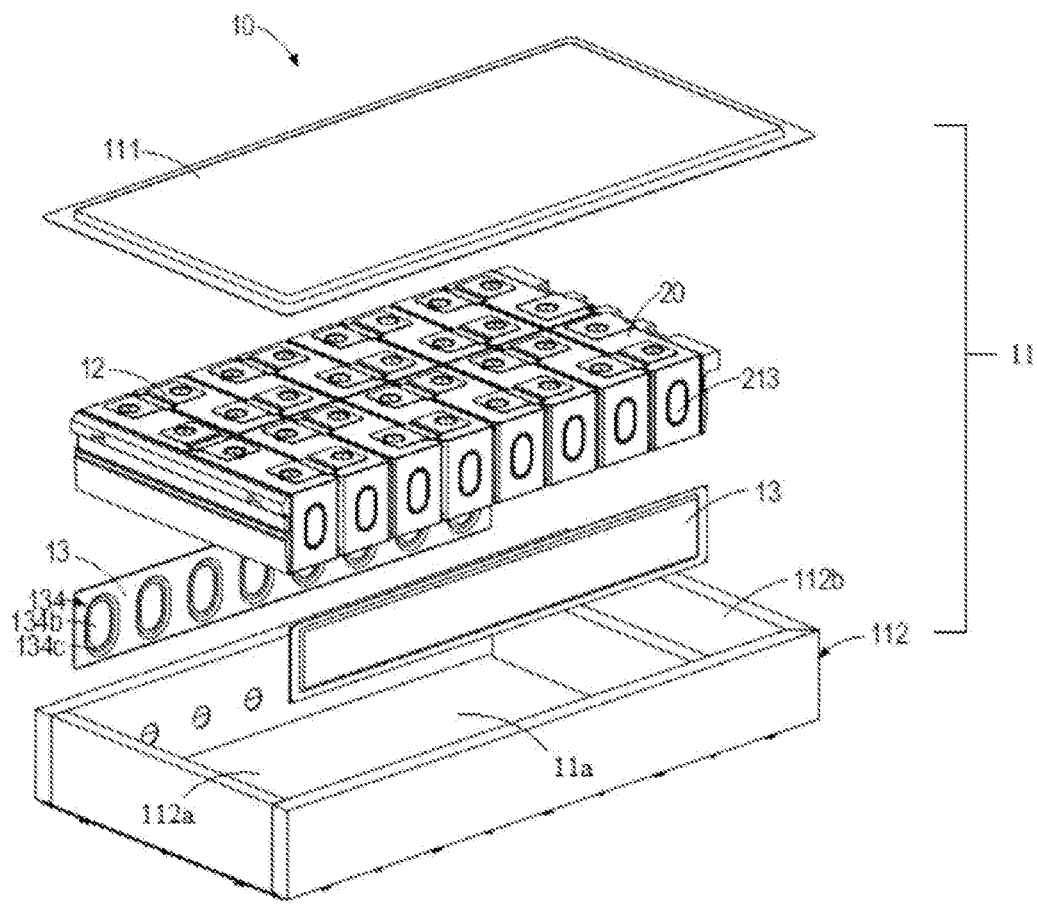
FIG. 6 shows an exploded view of a battery according to some embodiments of the present application.
Figure 7:
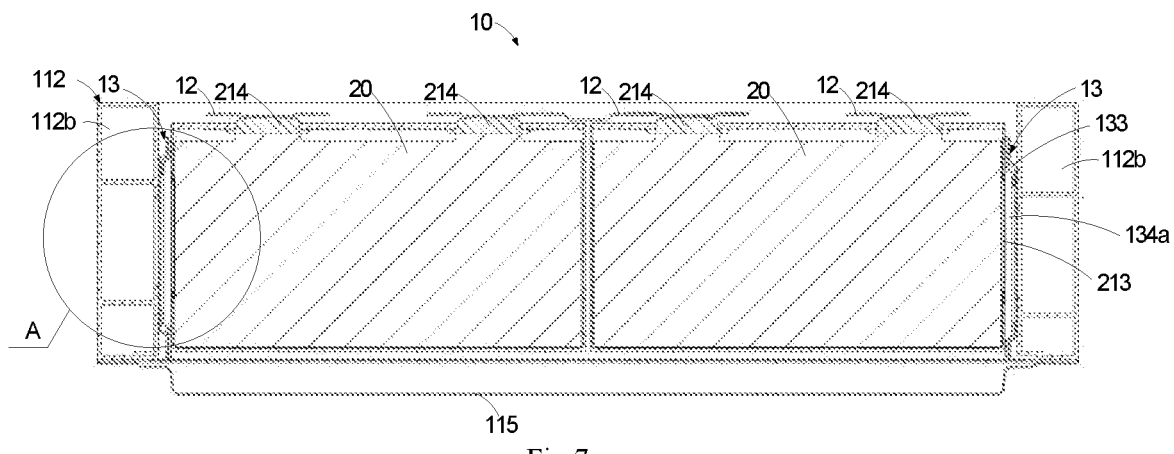
FIG. 7 shows a cross-sectional view of the battery shown in FIG. 6.

FIG. 6 shows an exploded view of a battery 10 accommodating a plurality of battery cells 20; and FIG. 7 shows a cross-sectional view of the battery 10 shown in FIG. 6. It can be understood that for ease of description, the above positive electrode terminal 214a and negative electrode terminal 214b can be collectively referred to as an electrode terminal 214, and the electrode terminal 214 is shown in FIG. 7. As shown in FIGS. 6-7, the battery 10 according to some embodiments of the present application includes a plurality of battery cells 20 and a bus component 12, wherein the bus component 12 is configured to electrically connect the plurality of battery cells 20 in series and/or parallel by connecting electrode terminals 214. At least one battery cell 20 of these battery cells 20 includes a pressure relief mechanism 213. In some embodiments, the pressure relief mechanism 213 may be provided on the battery cell, that may be more susceptible to thermal runaway due to its position in the battery 10, among the plurality of battery cells 20. Of course, it is also possible that each battery cell 20 in the battery 10 is provided with a pressure relief mechanism 213.

The pressure relief mechanism 213 is configured to, when an internal pressure or temperature of the at least one battery cell 20 where the pressure relief mechanism is located reaches a threshold, be actuated to release the internal pressure of the battery cell 20, so as to avoid more dangerous accidents. As mentioned above, the pressure relief mechanism 213 may also be called an anti-explosion valve, an air valve, a pressure relief valve or a safety valve, or the like. The bus component 12 is also called a bus bar or a bus, etc., which is a component that electrically connects a plurality of battery cells 20 in series and/or in parallel. After the plurality of battery cells 20 are connected in series and parallel via the bus component 12, they have a higher voltage, so the side with the bus component 12 is sometimes called the high-voltage side.

Figure 8:
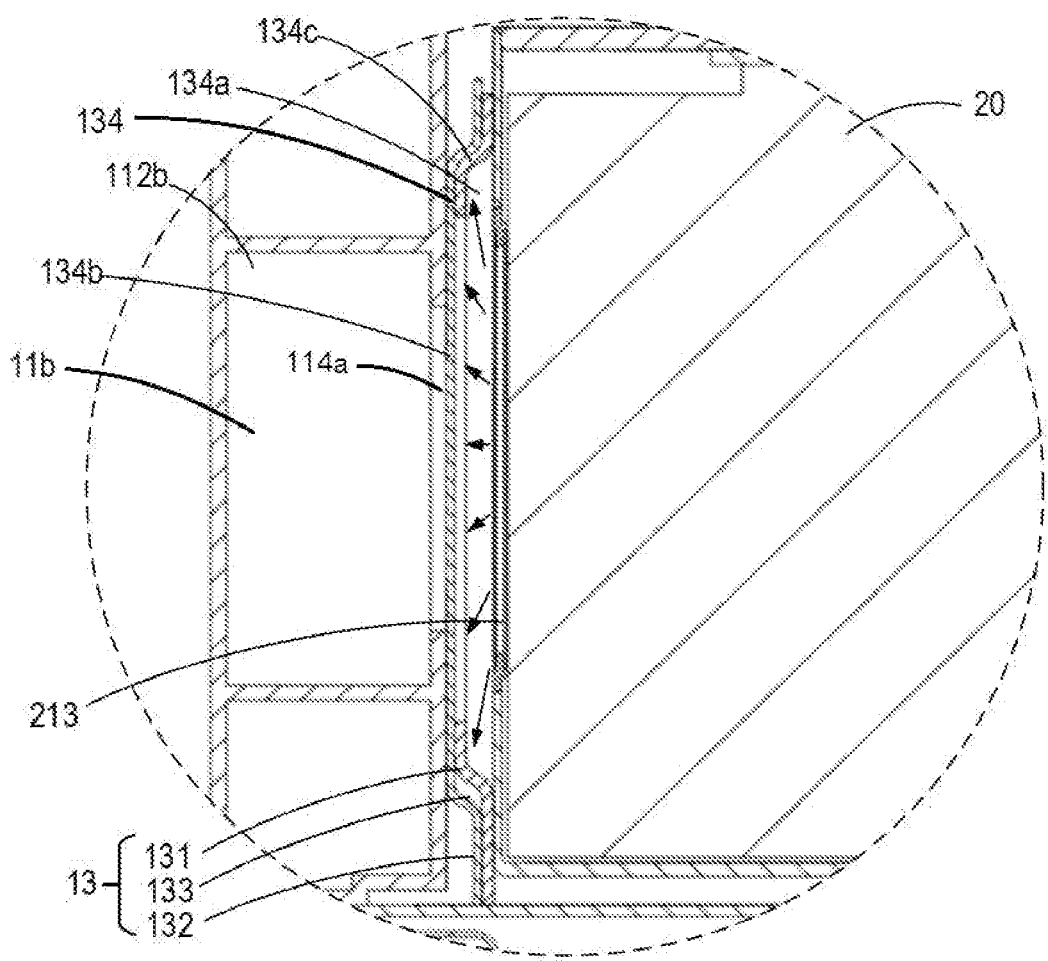
FIG. 8 shows a partially enlarged cross-sectional view of a portion A in FIG. 7, showing an exemplary avoidance structure formed on a thermal management component.

FIG. 8 shows a partially enlarged cross-sectional view of a pressure relief mechanism 213 included in the battery 10 shown in FIG. 7 and a thermal management component 13 associated with the pressure relief mechanism 213. As shown in FIGS. 6-8, the thermal management component 13 is configured such that when the pressure relief mechanism 213 is actuated, emissions discharged from the battery cell 20 pass through the thermal management component 13. It can be understood that the thermal management component 13 in the present application refers to a component capable of managing or adjusting the temperature of the battery cell 20, and the temperature management or adjustment here refers to heating or cooling the battery cell 20. Specifically, the thermal management component 13 may include at least one of a cooling component and a heating component. For example, in some cold areas in winter, heating the battery 10 before starting of the electric vehicle can improve the performance of the battery. During the use of the battery 10, the battery cell 20 will generate heat, resulting in an increase in temperature. Therefore, the thermal management component 13 can also be configured to accommodate a fluid to cool a plurality of battery cells 20. In order to achieve the effective cooling, the thermal management component 13 is generally attached to the battery cells 20 by means of a thermally conductive silicone, etc. It should be understood that the thermal management component may also be attached to the battery cell 20 by other means, such as using other adhesives.

In the description of the embodiments of the present application, the circumstances where the thermal management component 13 is configured to cool or reduce the temperature of the battery cell 20 will be mainly introduced. Under these circumstances, the thermal management component 13 can accommodate a cooling fluid to achieve the purpose of cooling. Therefore, the thermal management component 13 may also be called a cooling component, a cooling system or a cooling plate, etc. The fluid accommodated by the thermal management component 13 may also be called a cooling medium or a cooling fluid, or more specifically, may be called a cooling liquid or a cooling gas. Optionally, the fluid accommodated in the thermal management component 13 may flow in a circulating manner to achieve a better temperature adjustment effect. Optionally, the fluid may be water, a mixture of water and ethylene glycol, or air, etc.

With continued reference to FIG. 6, the battery 10 generally includes a case 11 for packaging one or more battery cells 20. The case 11 can prevent liquid or other foreign matters from affecting the charging or discharging of the battery cell. The case 11 may generally be composed of a cover body 111 and a case shell 112. The structure of the case 11, especially the case shell 112 of the case 11, will be described in more detail below.

Referring to FIGS. 6-8, unlike a conventional battery, an important feature of the battery 10 according to the embodiments of the present application is that the thermal management component 13 associated with the pressure relief mechanism 213 is attached to the same side (or the same wall) of the battery cell provided with the pressure relief mechanism 213, while the support component for supporting the battery cell 20 is attached to the other side (or another wall) intersecting therewith. For ease of description, hereinafter, one side of the battery cell 20 supported by the support component is referred to as the second wall (in some preferred embodiments, the second wall may be specifically understood as the bottom wall, or may be called the bottom). It should be understood that no matter how the battery cell 20 is placed in the battery or battery pack, such as being placed vertically, laterally, horizontally (in a lying manner) or upside down in the case 11, one side supported by the support component is referred to as the second wall. Accordingly, one side of the battery cell 20 to which the thermal management component 13 is attached and which is provided with the pressure relief mechanism 213 is referred to as a first wall (in some preferred embodiments, the first wall may also be specifically understood as a side wall, or may be referred to as a side portion).

Figure 2:
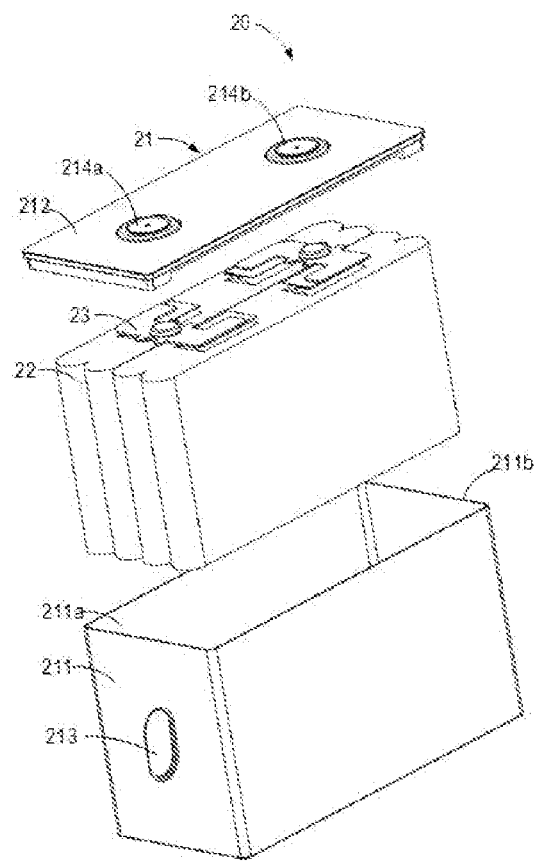
FIG. 2 shows an exploded view of a battery cell arranged vertically according to some embodiments of the present application.
Figure 3:
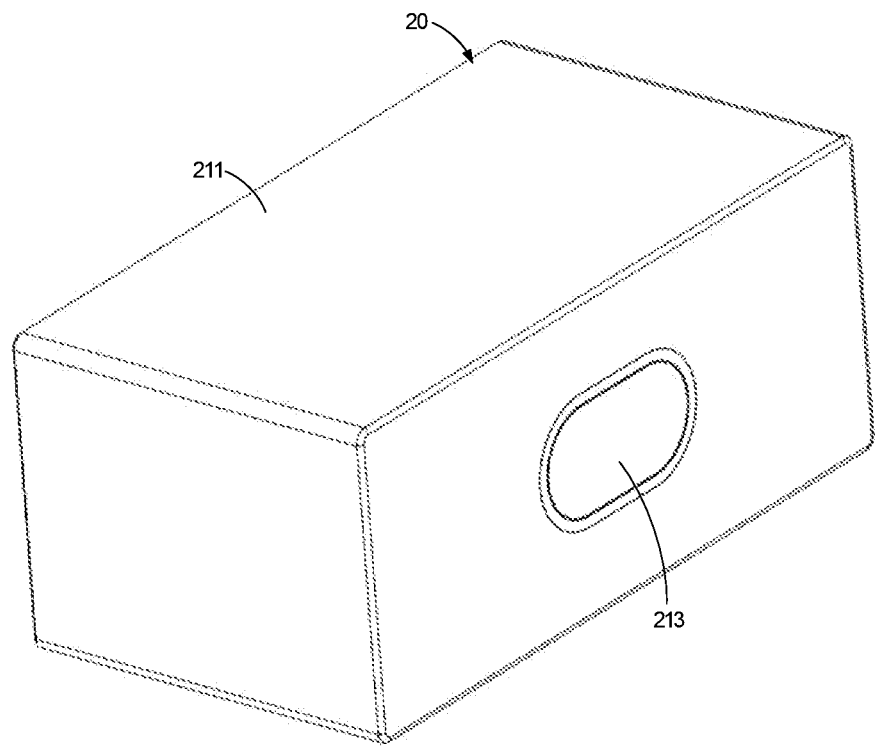
FIG. 3 shows a perspective view of a battery cell arranged horizontally according to some embodiments of the present application.
Figure 4:
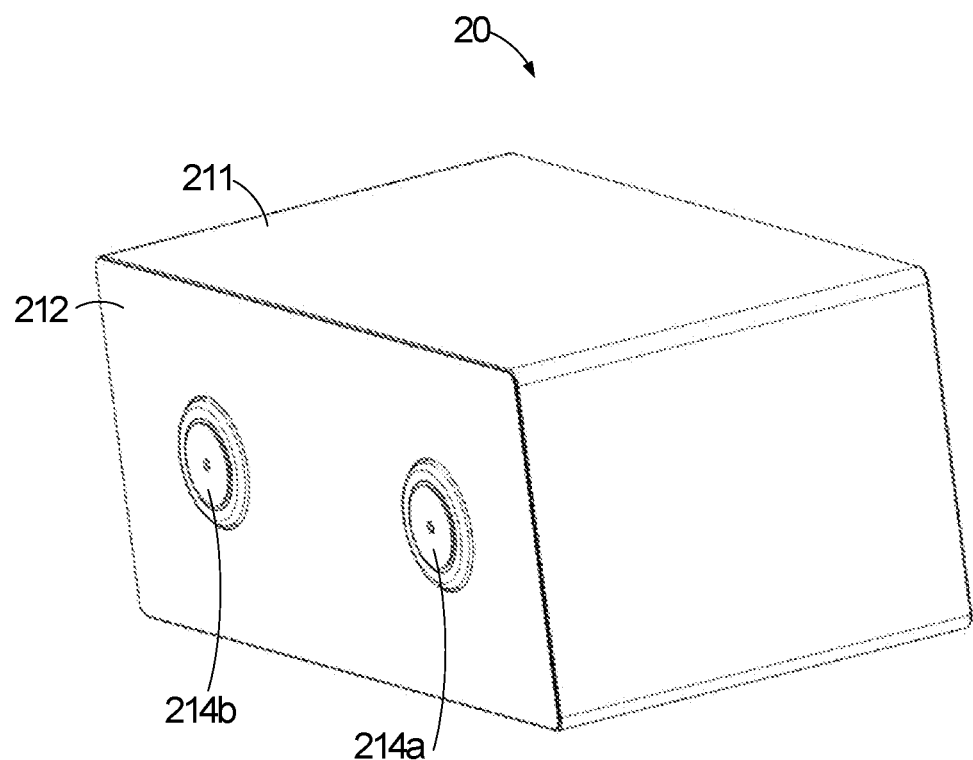
FIG. 4 shows a perspective view of the horizontally-arranged battery cell shown in FIG. 3 viewed from another angle.
Figure 5:
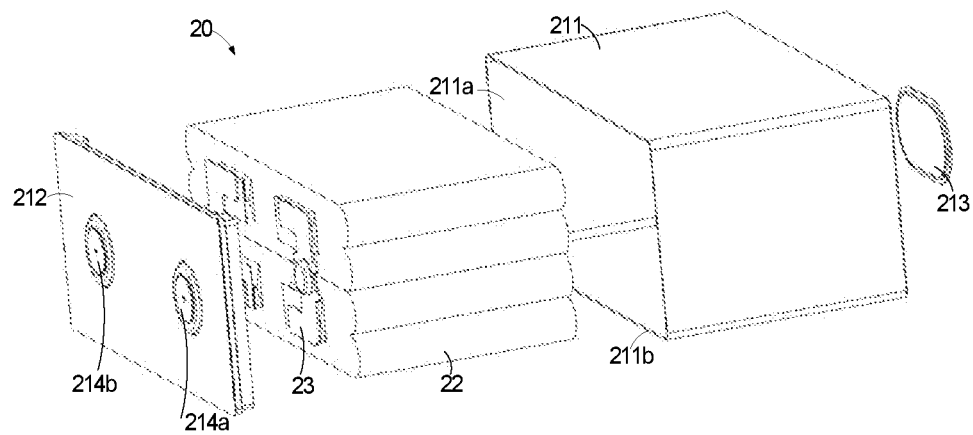
FIG. 5 shows an exploded view of the battery cell shown in FIG. 4.

It should be understood that "vertically placed" in the present application means that the battery cell 20 is installed in the case 11 in such a way that the cover plate 212 is adjacent to and approximately parallel to the cover body 111, as shown in FIGS. 2 and 6. Similarly, "horizontally placed" or "laterally placed" means that the battery cell 20 is installed in the case 11 in such a way that the cover plate 212 is approximately perpendicular to the cover body 111, as shown in FIGS. 3-5. "Placed upside down" means that the battery cell 20 is installed in the case 11 in such a way that the cover plate 212 is adjacent to and approximately parallel to a bottom portion 112a of the case shell 112.

Figure 9:
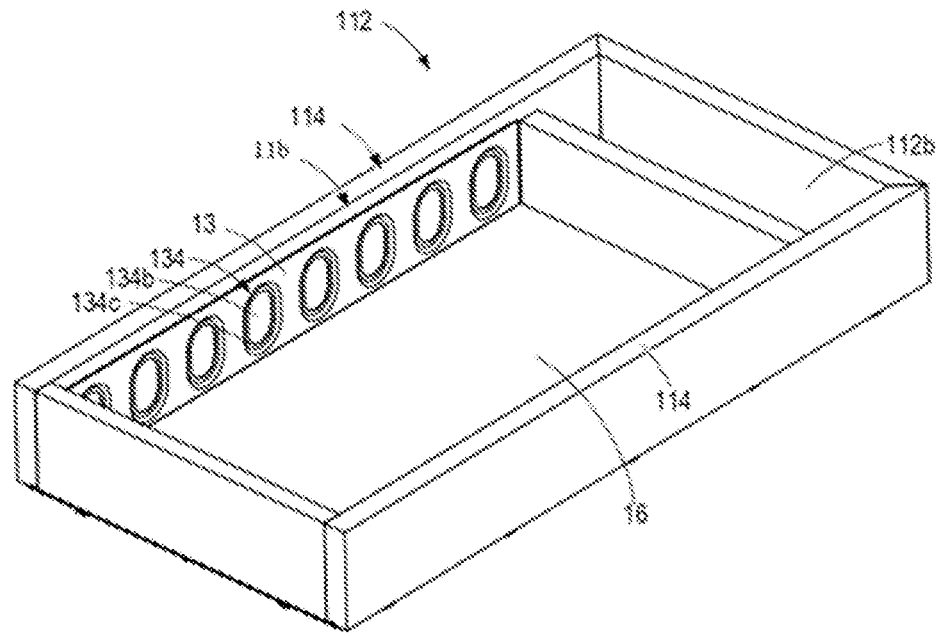
FIG. 9 shows a perspective view of a case shell part of a case of a battery according to some embodiments of the present application.
Figure 10:
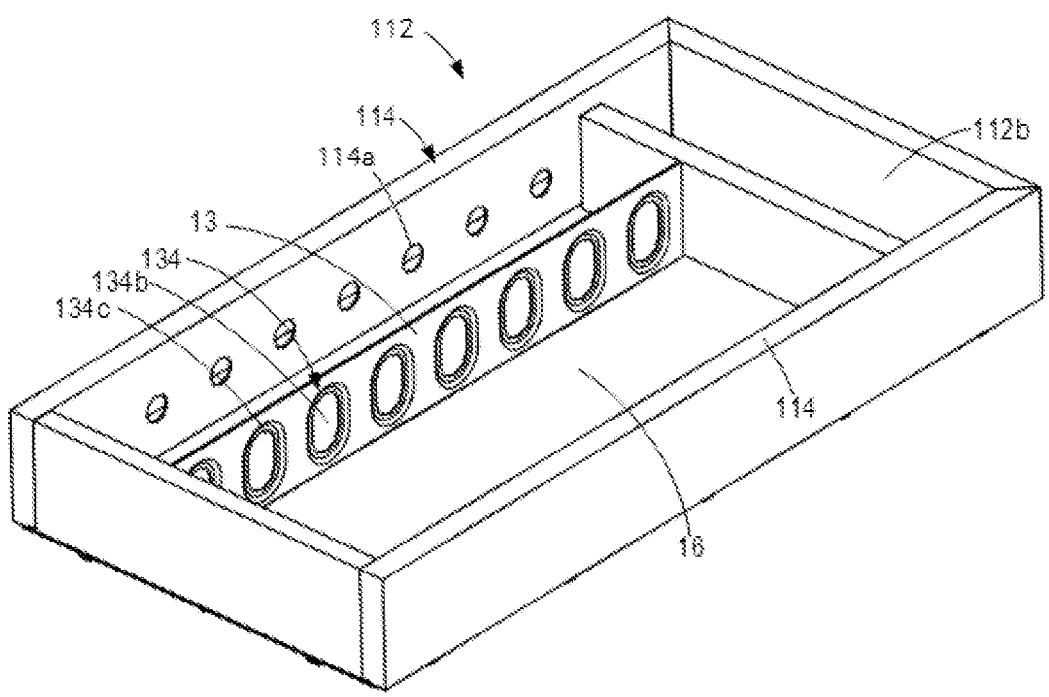
FIG. 10 shows a perspective view of a case shell part of a case of a battery according to some other embodiments of the present application.
Figure 11:
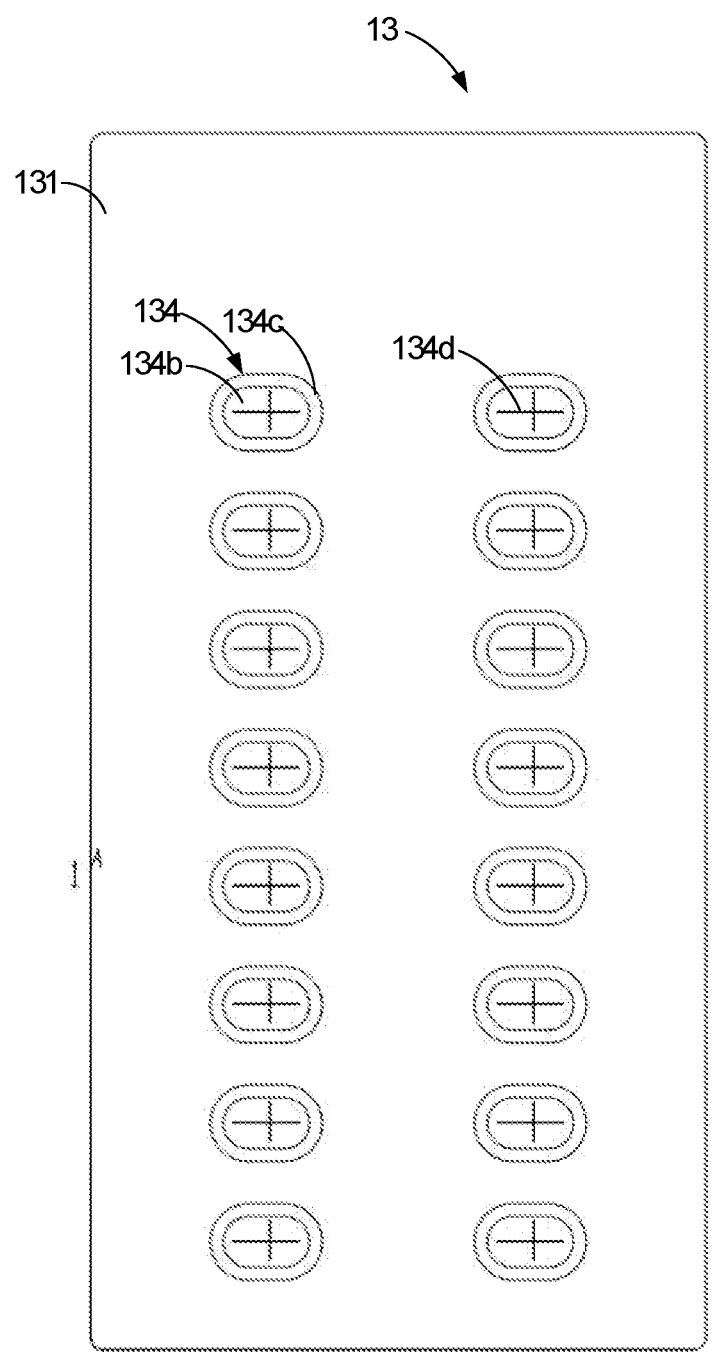
FIG. 11 shows a top view of a thermal management component according to some embodiments of the present application.
Figure 12:
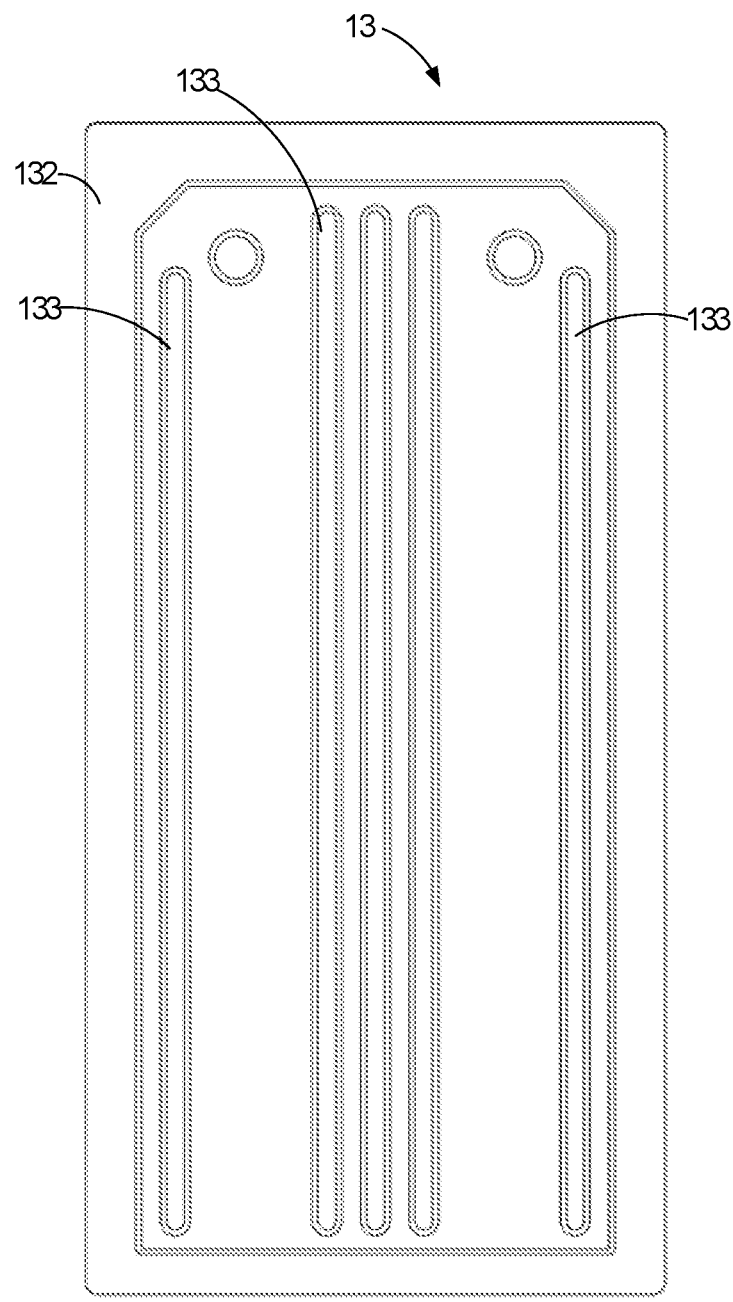
FIG. 12 shows a bottom view of the thermal management component shown in FIG. 11.

It should also be understood that the first wall and the second wall referred to in the present application may be any suitable wall of the battery cell 20, including the side wall, the bottom wall and the cover plate 212, as long as they can intersect with each other. The support component refers to a component used to support the battery cell 20, for example, may be the thermal management component 13 or a portion thereof, or any suitable portion of the case shell 112 of the battery 10 as shown in FIGS. 6-8, or a protective member or a protective plate 115 of the battery 10 as shown in FIG. 7, etc. Certainly, the support component may also be a component arranged only on an inner side of the case shell 112 to support the battery cell 20. For ease of understanding, FIGS. 9-10 schematically show an embodiment in which a bottom portion of the case shell 112 is provided as the support component 16 or the support component 16 constitutes the bottom portion of the case shell 112 or a portion thereof, wherein the battery cell 20 is removed to more clearly show the characteristics of the side portion 112b and the bottom portion of the case shell 112.

No matter whether the battery cell 20 is placed vertically, laterally, horizontally or upside down, in the battery 10 according to the embodiment of the present application, the support component 16, the thermal management component 13 and the pressure relief mechanism 213 are arranged on two intersecting wall surfaces of the battery cell 20, which will provide flexibility in the space occupied by the battery that the prior art does not have. That is, in the embodiment of the present application, the space occupied by the design of the pressure relief mechanism 213 and the support component 16 is dispersed in two different dimensions or directions.

Typically, for the basically prismatic battery 10 and battery cell 20, the design of the pressure relief mechanism 213 and the support component 16 will mainly occupy a transverse space and a height space of a vehicle respectively. This not only helps to make the vehicle design which cannot be supported or applied by batteries in the prior art feasible, but also helps to improve the space utilization ratio available for arranging battery devices on the vehicle in some cases, thereby improving the energy density of the battery devices which can be arranged in the vehicle. Specifically, with the development of the battery technology up to now, under the condition of ensuring safety, it is very difficult to reduce by 1 mm the size occupied by all structures and components of the battery 10 except the space for accommodating the battery cell 20. Therefore, the space occupied by the design of the pressure relief mechanism 213 and the support component 16 is dispersed to two different dimensions or directions, so that the compactness of the battery structure may be significantly improved for at least part of the vehicle design, thereby improving the energy density of the battery.

According to some embodiments of the present application, as shown in FIGS. 6-8, the pressure relief mechanism 213 may be disposed at a first wall of the battery cell 20, and the thermal management component 13 is attached to the first wall. In some embodiments, the pressure relief mechanism 213 can be arranged such that its outer surface is flush with an outer surface of the first wall. This flush arrangement is more conducive to the attachment between the first wall and the thermal management component 13. In some alternative embodiments, the outer surface of the pressure relief mechanism 213 can also be arranged to be recessed into an outer surface of the first wall. This recessed structure can provide a part of avoidance space, thereby reducing or even omitting, for example, an avoidance structure 134 in the thermal management component 13. The avoidance structure 134 will be explained in detail below.

According to some embodiments of the present application, as shown in FIGS. 9-10, the support component 16 is attached to the second wall to support the battery cell 20 in a direction opposite the direction of gravity. Furthermore, as shown in FIGS. 6-8, the pressure relief mechanism 213 and the thermal management component 13 may be disposed on the first wall of the battery cell 20 parallel to the direction of gravity, regardless of how the battery cell 20 is placed in the case 11. For example, the first wall is the side wall of the battery cell 20 itself when the battery cell 20 is placed vertically or upside down in the case 11, and the first wall may be a cover plate 212 or a wall opposite the cover plate 212 when the battery cell 20 is placed horizontally in the case 11.

For ease of description, some embodiments in which the pressure relief mechanism 213 and the thermal management component 13 are arranged on the side portion or the side wall of the battery cell 20 will be described with reference to FIGS. 6-8, wherein the specific structure and design of the case 11 configured to package one or more battery cells 20 in the battery 10 described above will be explained in more detail with reference to FIGS. 9-10.

In some embodiments, as shown in FIGS. 6-7 and FIGS. 9-10, the case 11 may include a cover body 111 and a case shell 112. The cover body 111 and the case shell 112 are hermetically assembled together to jointly form an electrical chamber 11a for accommodating the plurality of battery cells 20 in an enclosing manner. In some embodiments, the thermal management component 13 may constitute a part of the case 11 for accommodating the plurality of battery cells. For example, the thermal management component 13 may constitute a side portion 112b of the case shell 112 of the case 11 or constitute a part of the side portion 112b. In addition to the side portion 112b, the case shell 112 also includes a bottom portion 112a. As shown in FIGS. 6-7, in some embodiments, the side portion 112b is formed as a frame structure and can be assembled with the thermal management component 13. In this way, the structure of the battery 10 can be made more compact, and the effective utilization of space can be improved, thereby facilitating the improvement of the energy density.

In some embodiments, the support component 16 may constitute a part of the case shell 112, or, for example, the bottom portion 112a of the case shell 112 or a partial structure thereof constitutes the support component 16. Or, according to some alternative embodiments, the support component 16 may also be arranged inside the case shell 112.

In some embodiments, the thermal management component 13 may be integrally formed with the support component 16. It can be understood that due to the structural design that the thermal management component 13 and the support component 16 are arranged on the first wall and the second wall which intersect, the thermal management component 13 and the support component 16 may also be designed to be intersected or connected, and on this basis, they can be further integrated. For example, the thermal management component 13 and the support component 16 may form an integral structure of an L-shape, an inverted-T shape, or a U-shape, etc. Therefore, the structural strength of the battery can be improved. In some alternative embodiments, the support component 16 and the thermal management component 13 may be fastened together in an appropriate manner to facilitate manufacturing the support component 16 and the thermal management component 13, and thus reduce the manufacturing cost.

In some alternative embodiments, the thermal management component 13 may also be integrally formed with the side portion 112b or the bottom portion 112a of the case shell 112, so that the case shell 112 of the case 11 may be integrally formed. This forming method can make the case shell 112 part stronger and less prone to leakage.

In other words, there may be various relations between the thermal management component 13 and the case 11. For example, in some alternative embodiments, the thermal management component 13 may not be a part of the case shell 112 of the case 11, but a component assembled on one side of the case shell 112. This way will be beneficial to keeping the case 11 airtight. In other alternative embodiments, the thermal management component 13 can also be integrated in the case shell 112 in an appropriate manner, which is also beneficial to keeping the case 11 airtight.

In some embodiments, as shown in FIGS. 6-9, the battery 10 further includes a collection chamber 11b formed by at least part of the side portion 112b of the case shell 112. The collection chamber 11b in the present application refers to a cavity that collects the emissions from the battery cell 20 and the thermal management component 13 when the pressure relief mechanism 213 is actuated. For example, the side portion 112b or a part of the side portion 112b may be configured as a hollow structure, and the hollow structure constitutes the collection chamber 11b, which can make the battery 10 lightweight while making the battery 10 more compact. The thermal management component 13 may be disposed between the side portion 112b and the battery cell 20. Specifically, the thermal management component 13 may be disposed between the side portion 112b and the first wall of the battery cell 20.

Additionally or as an alternative solution, the collection chamber 11b may also be constituted by a beam 114 arranged to extend between the cover body 111 and the case shell 112. The beam 114 extends from the bottom portion 112a of the case shell 112 to the cover body 111 in a direction perpendicular to the bottom portion 112a. The thermal management component 13 may be disposed between the beam 114 and the battery cell 20. Specifically, the thermal management component 13 may be disposed between the beam 114 and the first wall of the battery cell 20. In some embodiments, the beam 114 can have a hollow structure, and a hollow space of the beam 114 can constitute the collection chamber 11b.

In some embodiments, the side portion 112b of the case shell 112 and the beam 114 may be the same component.

The collection chamber 11b is configured to collect the emissions and may be sealed or unsealed. In some embodiments, the collection chamber 11b may contain air or another gas. Optionally, the collection chamber 11b may also contain liquid, such as a cooling liquid, or a component for accommodating the liquid is disposed to further cool the emissions entering the collection chamber 11b. Further, optionally, the gas or the liquid in the collection chamber 11b flows in a circulating manner.

In some embodiments, the support component 16 may further include an additional collection chamber (not shown in the figures), and the additional collection chamber can be operably communicated with the collection chamber 11b at the bottom or lower portion of the collection chamber 11b, so as to accommodate the emissions from the battery cell 20. The additional collection chamber may also provide a greater cooling area for the emissions, so that the emissions can be effectively cooled in the battery 10 before being discharged, thereby improving the safety performance of the battery 10. A diversion structure may also be provided in the collection chamber 11b. The diversion structure may assist in guiding the emissions to a predetermined position in the collection chamber 11b through a structure such as a diversion recess, and the predetermined position may be located near the position where the additional collection chamber is communicated with the collection chamber 11b. This helps to more efficiently guide the emissions to the additional collection chamber as soon as possible, or discharge the emissions out of the battery 10 safely via the additional collection chamber.

In the embodiment where the pressure relief mechanism 213 and the thermal management component 13 are arranged at the first wall of the battery cell 20 as described above with reference to FIGS. 6-10, the thermal management component 13 may be further designed to have any one or more of the structural features and attributes set forth below.

FIG. 11 to FIG. 14 respectively show structural views from different angles, a cross-sectional view and an exploded view of the thermal management component 13 according to some embodiments of the present application. As shown in FIGS. 11-14 and FIG. 8 mentioned above, in some embodiments, the thermal management component 13 may include a pair of thermally conductive plates and a flow channel 133 formed between the pair of thermally conductive plates. For the convenience of the description below, the pair of thermally conductive plates will be referred to as a first thermally conductive plate 131 attached to the plurality of battery cells 20, and a second thermally conductive plate 132 arranged on the side of the first thermally conductive plate 131 away from the battery cell 20. The flow channel 133 is used for a fluid to flow therein. In some embodiments, the thermal management component 13 including the first thermally conductive plate 131, the second thermally conductive plate 132 and the flow channel 133 may be integrally formed by a suitable process such as blow molding. In some alternative embodiments, the first thermally conductive plate 131 and the second thermally conductive plate 132 are assembled together by welding (such as brazing). In some alternative embodiments, the first thermally conductive plate 131, the second thermally conductive plate 132 and the flow channel 133 may also be formed separately and assembled together to form the thermal management component 13.

For example, in some embodiments, a semi-recess structure corresponding to the flow channel 133 may be formed on the first thermally conductive plate 131 and the second thermally conductive plate 132, respectively, and the semi-recess structures of the first thermally conductive plate 131 and the second thermally conductive plate 132 are aligned with each other. By assembling the first thermally conductive plate 131 and the second thermally conductive plate 132 together, the semi-recess structures of the first thermally conductive plate 131 and the second thermally conductive plate 132 are combined into the flow channel 133, and finally the thermal management component 13 is formed.

Of course, it should be understood that the specific structure of the thermal management component 13 described above is only illustrative and is not intended to limit the scope of protection of the present application. Any other suitable structure or arrangement is also possible. For example, in some alternative embodiments, at least one of the first thermally conductive plate 131, the second thermally conductive plate 132, and the flow channel 133 may be omitted. For example, the second thermally conductive plate 132 may be omitted. That is to say, in some embodiments, the thermal management component 13 may only include the first thermally conductive plate 131 and the flow channel 133 arranged on one side thereof or embedded therein. For ease of description, the improvement related to the thermal management component 13 in the present application will be described by taking the thermal management component 13 including the first thermally conductive plate 131, the second thermally conductive plate 132 and the flow channel 133 as an example.

As mentioned above, when the pressure relief mechanism 213 is actuated, it is necessary to provide an avoidance structure 134 outside the battery cell 20 at a position corresponding to the pressure relief mechanism 213, so that the pressure relief mechanism 213 can be smoothly actuated to play its due role. In some embodiments, the avoidance structure 134 may be arranged on the thermal management component 13, such that when the thermal management component 13 is attached to the plurality of battery cells 20, an avoidance chamber 134a can be formed between the avoidance structure 134 and the pressure relief mechanism 213. That is to say, the avoidance chamber 134a mentioned in the present application refers to a closed cavity formed jointly by the avoidance structure 134 and the pressure relief mechanism 213. In this solution, for the discharge of the emissions from the battery cell 20, an inlet side surface of the avoidance chamber 134a can be opened by the actuation of the pressure relief mechanism 213, and an outlet side surface opposite to the inlet side surface can be partially damaged by the high-temperature and high-pressure emissions, thereby forming a relief channel for the emissions. According to some other embodiments, the avoidance chamber 134a may be, for example, a non-closed cavity formed jointly by the avoidance structure 134 and the pressure relief mechanism 213. The outlet side surface of the non-closed cavity may be originally provided with a channel for the emissions to flow out thereof.

Figure 13:
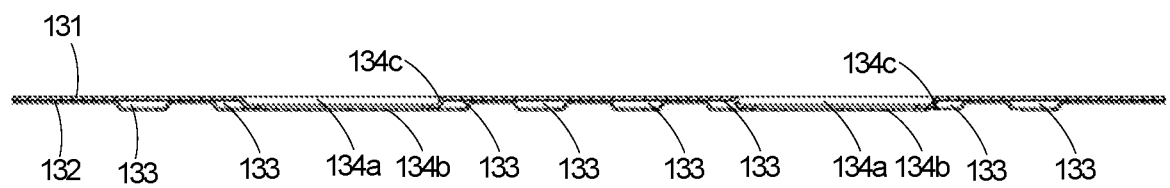
FIG. 13 shows an A-A cross-sectional view of the thermal management component shown in FIG. 11.
Figure 14:
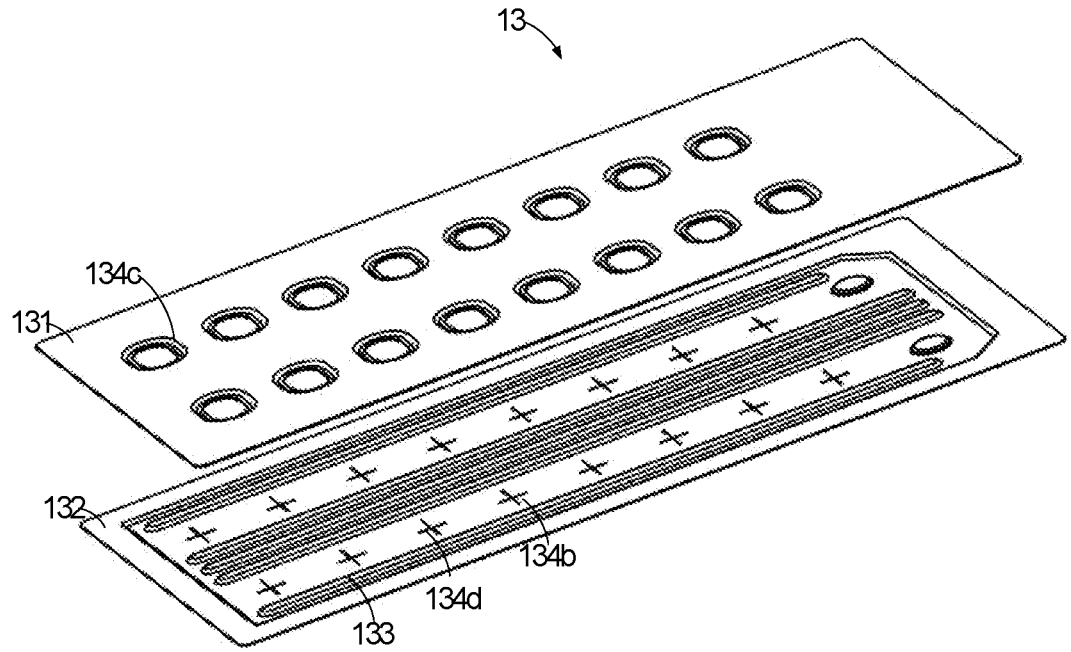
FIG. 14 shows an exploded view of the thermal management component shown in FIG. 11.

Further referring to FIGS. 8 and 13, in some embodiments, the avoidance structure 134 formed on the thermal management component 13 may include a bottom avoidance wall 134b and a side avoidance wall 134c surrounding the avoidance chamber 134a. The bottom avoidance wall 134b and the side avoidance wall 134c in the present application are described relative to the avoidance chamber 134a. Specifically, the bottom avoidance wall 134b refers to the wall of the avoidance chamber 134a opposite to the pressure relief mechanism 213, and the side avoidance wall 134c is the wall adjacent to the bottom avoidance wall 134b and at a predetermined angle to surround the avoidance chamber 134a. In some embodiments, the bottom avoidance wall 134b may be a part of the second thermally conductive plate 132, and the side avoidance wall 134c may be a part of the first thermally conductive plate 131.

For example, in some embodiments, the avoidance structure 134 may be formed by recessing a part of the first thermally conductive plate 131 toward the second thermally conductive plate 132 and forming an opening, and fixing an edge of the opening and the second thermally conductive plate 132 together by means of an appropriate fixing method. When the pressure relief mechanism 213 is actuated, the emissions from the battery cell 20 will first enter the avoidance chamber 134a. As shown by the arrows in the avoidance chamber 134a in FIG. 8, the emissions will be discharged outward in directions approximately in the shape of a sector.

Different from the conventional thermal management component, the thermal management component 13 according to an embodiment of the present application can be damaged when the pressure relief mechanism 213 is actuated, so that the emissions from the battery cell 20 pass through the thermal management component 13. The advantage of this arrangement is that the high-temperature and high-pressure emissions from the battery cell 20 can pass through the thermal management component 13 smoothly, thereby avoiding secondary accidents caused by the emissions not being discharged in a timely manner, and thus improving the safety performance of the battery 10.

To enable the emissions to pass through the thermal management component 13 smoothly, a through hole or a partial relief mechanism may be provided at the position of the thermal management component 13 opposite the pressure relief mechanism 213. In some embodiments, for example, the partial relief mechanism may be provided on the bottom avoidance wall 134b, namely the second thermally conductive plate 132. The partial relief mechanism in the present application refers to a mechanism that can be actuated when the pressure relief mechanism 213 is actuated so as to allow at least the emissions from the battery cell 20 to be discharged through the thermal management component 13. In some embodiments, the partial relief mechanism may also have the same configuration as the pressure relief mechanism 213 on the battery cell 20. That is to say, in some embodiments, the partial relief mechanism may be a mechanism arranged on the second thermally conductive plate 132 and having the same configuration as the pressure relief mechanism 213. In some alternative embodiments, the partial relief mechanism may also have a configuration different from the pressure relief mechanism 213, but only be a weakened structure provided at the bottom avoidance wall 134b. For example, the weakened structure may include, but is not limited to: a reduced-thickness portion integrated with the bottom avoidance wall 134b, an indentation (such as a cross indentation 134d shown in FIGS. 11 and 14), or a vulnerable portion made of a vulnerable material such as plastic and installed at the bottom avoidance wall 134b, etc.

In some embodiments, in order to enable the emissions to pass through the thermal management component 13 smoothly, the avoidance structure 134 may also be a through hole that penetrates the thermal management component 13. That is to say, the avoidance structure 134 may only have the side avoidance wall 134c, and the side avoidance wall 134c is the hole wall of the through hole. In this case, when the pressure relief mechanism 213 is actuated, the emissions from the battery cell 20 can be directly discharged through the avoidance structure 134. In this way, the formation of secondary high voltage can be avoided more effectively, thereby improving the safety performance of the battery 10.

In some embodiments as described above and shown in FIGS. 6-9, the battery 10 includes a collection chamber 11b formed by at least part of the side portion 112b of the case shell 112, and the collection chamber 11b is configured to, when the pressure relief mechanism 213 is actuated, collect the emissions from the battery cell 20 and/or the thermal management component 13. In such an embodiment, as shown in FIG. 8, a discharge hole 114a may be provided at a position or a wall surface of the side portion 112b of the case shell 112 corresponding to the thermal management component 13 or the pressure relief mechanism 213. In this case, after passing through the thermal management component 13, the emissions enter, via the discharge hole 114a, the collection chamber 11b formed by the side portion 112b.

It can be understood that, as mentioned above, in some alternative embodiments, the collection chamber 11b may also be composed of a beam 114 arranged to extend between the cover body 111 and the case shell 112. In this case, the aforementioned discharge hole 114a may be correspondingly provided at the position or wall surface of the beam 114 corresponding to the thermal management component 13 or the pressure relief mechanism 213, so that the emissions from the battery cell 20 and/or the thermal management component 13 enter, via the discharge hole 114a, the collection chamber 11b formed by the beam 114.

In some embodiments, the thermal management component 13 may be further configured to be damaged when the pressure relief mechanism 213 is actuated, such that the fluid flows out. The outflow of the fluid can quickly lower the temperature of the high-temperature and high-pressure emissions from the battery cell 20 and extinguish fire, thereby preventing further damage to other battery cells 20 and the battery 10, which causes more serious accidents. For example, in some embodiments, the side avoidance wall 134c may also be formed to be easily damaged by emissions from the battery cell 20.

Since the internal pressure of the battery cell 20 is relatively large, the emissions from the battery cell 20 will be discharged outward in a roughly cone shape. In this case, if the contact area between the side avoidance wall 134c and the emissions can be increased, the possibility of the side avoidance wall 134c being damaged can be increased. For example, in some embodiments, the side avoidance wall 134c forms a predetermined angle with respect to the bottom avoidance wall bottom wall 134b, and the predetermined angle is between 105° and 175°. Through reasonable setting of the angle, the side avoidance wall 134c can be more easily damaged when the pressure relief mechanism 213 is actuated, so as to further enable the fluid to flow out and come into contact with the emissions. The fluid (such as a cooling liquid) is vaporized by the high temperature of the emissions at the moment of flowing out, thereby absorbing a large amount of heat from the emissions and achieving the effect of cooling the emissions in time.

In addition, this arrangement of the side avoidance wall 134c can also be applied to the above situation where the avoidance chamber 134a is provided and the situation where the avoidance structure 134 is a through hole. For example, where the avoidance structure 134 is a through hole, the diameter of the through hole may gradually decrease in the direction of the pressure relief mechanism 213 toward the thermal management component 13, and an included angle formed by the hole wall of the through hole with respect to the direction of the pressure relief mechanism 213 toward the thermal management component 13 may be, for example, between 15° and 85°.

In some other embodiments, any type of weakened structure may be also provided on the side avoidance wall 134c, so that when the pressure relief mechanism 213 is actuated, the side avoidance wall 134c is damaged by the emissions to allow a fluid to flow out.

The above embodiments describe the case where the thermal management component 13 has the avoidance structure 134. However, in some alternative embodiments, the thermal management component 13 may not include the avoidance structure 134. In this case, the avoidance chamber 134 may be formed by a protruding portion formed around the pressure relief mechanism 213 and the thermal management component 13, for example. In addition, a partial relief mechanism or a weakened structure may be disposed on the thermal management component 13 at a position opposite to the pressure relief mechanism 213, so that the emissions from the battery cell can pass through the thermal management component 13 and/or break through the thermal management component 13 such that the fluid flows out.

In some other alternative embodiments, the pressure relief mechanism 213 can be designed such that same can be actuated when no avoidance space is required. Such a pressure relief mechanism 213 can be arranged close to the thermal management component 13, and the thermal management component 13 may not have the avoidance structure 134 and need not form the avoidance chamber 134a. This is also feasible.

In the embodiment described above in which the avoidance chamber 134a exists, the avoidance chamber 134a may be designed to be isolated from the collection chamber 11b by the thermal management component 13. The so-called "isolation" here refers to separation, which may not be sealed. This can be more conducive for the emissions to break through the side avoidance wall 134c such that the fluid flows out, so as to further lower the temperature of the emissions and extinguish fire, thereby improving the safety performance of the battery. In addition, in the case where the avoidance structure 134 is a through hole as described above, the avoidance chamber 134a and the collection chamber 11b may be in communication with each other. This approach is more conducive to the discharge of the emissions, so as to avoid potential safety hazards caused by secondary high pressure.

The battery according to embodiments of the present application has been described above with reference to FIGS. 1 to 14, and a method and device for preparing a battery according to the embodiments of the present application will be described below with reference to FIGS. 15 and 16, wherein for the parts not described in detail, reference can be made to the foregoing embodiments.

Figure 15:
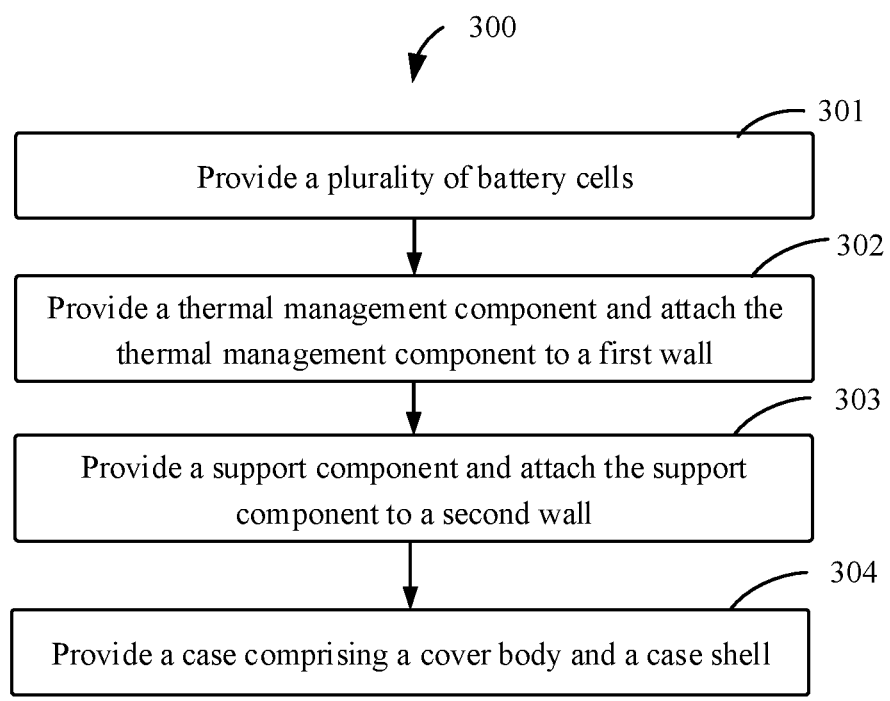
FIG. 15 shows a schematic flow chart of some embodiments of a method for preparing a battery of the present application.

Specifically, FIG. 15 shows a schematic flow chart of a method 300 for preparing a battery according to an embodiment of the present application. As shown in FIG. 15, the method 300 includes: 301 providing a plurality of battery cells, at least one of the plurality of battery cells including a pressure relief mechanism and at least two walls, the at least two walls including a first wall and a second wall that intersect with each other, the pressure relief mechanism being disposed at the first wall, and the pressure relief mechanism being configured to, when an internal pressure or temperature of the battery cell reaches a threshold, be actuated to release the internal pressure; 302 providing a thermal management component, and attaching the thermal management component to the first wall, the thermal management component being configured to accommodate a fluid to adjust the temperature of the battery cell, and being configured such that when the pressure relief mechanism is actuated, emissions discharged from the battery cell pass through the thermal management component; and 303 providing a support component, and attaching the support component to the second wall to support the battery cell.

In some embodiments, the method further includes: 304 providing a case, the case including a cover body and a case shell, and the case shell and the cover body jointly forming an electrical chamber for accommodating the battery cell in an enclosing manner; and providing the support component on an inner side of the case shell. Or, according to some alternative embodiments, a part of the case shell may be used as the support component.

In some embodiments, the case further includes a beam extending between the cover body and the case shell which are arranged opposite each other, and providing the thermal management component includes arranging the thermal management component between the beam and the first wall.

Figure 16:
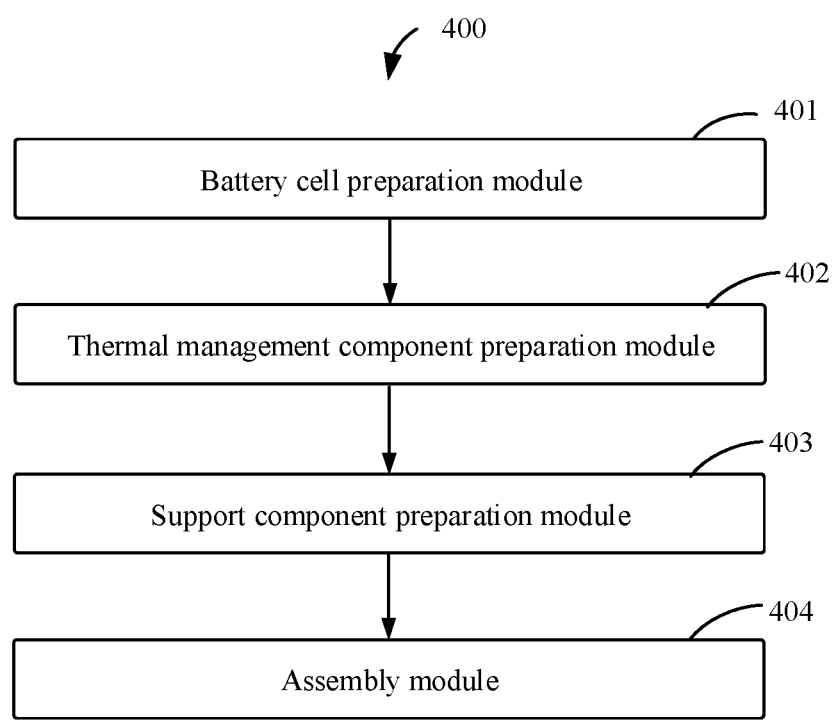
FIG. 16 shows a schematic structural diagram of some embodiments of an apparatus for preparing a battery of the present application.

FIG. 16 shows a schematic block diagram of an apparatus 400 for preparing a battery according to an embodiment of the present application. As shown in FIG. 16, the apparatus 400 according to the embodiment of the present application includes: a battery cell preparation module 401, configured to prepare a plurality of battery cells, at least one of the plurality of battery cells including: at least two walls and a pressure relief mechanism, the at least two walls including a first wall and a second wall that intersect with each other, the pressure relief mechanism being disposed at the first wall, and the pressure relief mechanism being configured to, when an internal pressure or temperature of the battery cell reaches a threshold, be actuated to release the internal pressure; a thermal management component preparation module 402, configured to prepare a thermal management component, the thermal management component being configured to accommodate a fluid to adjust the temperature of the battery cell, and the thermal management component being configured such that when the pressure relief mechanism is actuated, emissions discharged from the battery cell pass through the thermal management component; a support component preparation module 403, configured to prepare a support component, the support component being configured to support the battery cell; and an assembly module 404, configured to attach the thermal management component to the first wall and attach the support component to the second wall.

It should be finally noted that, the above embodiments are merely used for illustrating, rather than limiting, the technical solutions of the present application. Although the present application has been described in detail with reference to the foregoing embodiments, it should be understood by those of ordinary skill in the art that, they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery, comprising:
    a battery cell, the battery cell comprising:
        at least two walls, the at least two walls comprising a first wall and a second wall that intersect with each other; and
        a pressure relief mechanism, the pressure relief mechanism being disposed at the first wall, and the pressure relief mechanism being configured to, when an internal pressure or a temperature of the battery cell reaches a threshold, be actuated to release the internal pressure;
    a thermal management component attached to the first wall, the thermal management component being configured to accommodate a cooling liquid flowing in a circulating manner to adjust the temperature of the battery cell; and
    a support component attached to the second wall, and configured to support the battery cell;
    wherein the thermal management component is configured such that when the pressure relief mechanism is actuated, emissions discharged from the battery cell pass through the thermal management component, the thermal management component is configured to be capable of being damaged by the emissions discharged from the battery cell, so that the cooling liquid flows out from interior of the thermal management component.

2. The battery according to claim 1, wherein the battery cell further comprises:
    a housing, the housing comprising an accommodating chamber formed by a bottom wall and side walls and an opening capable of approaching the accommodating chamber; and
    a cover plate, the cover plate being suitable for closing the opening;
    wherein the first wall comprises the cover plate or at least one of the side walls, and the second wall is the bottom wall.

3. The battery according to claim 1, wherein the battery further comprises:
    a case, the case comprising a cover body and a case shell, and the case shell and the cover body jointly forming an electrical chamber for accommodating the battery cell in an enclosing manner,
    wherein the support component is a portion of the case shell or is arranged on an inner side of the case shell.

4. The battery according to claim 3, wherein the case further comprises a beam extending between the cover body and the case shell which are arranged opposite each other, and the thermal management component is arranged between the beam and the first wall.

5. The battery according to claim 1, wherein the thermal management component and the support component form an integral structure.

6. The battery according to claim 1, wherein the thermal management component is provided with a through hole, and the through hole is configured to allow the emissions discharged from the battery cell to pass through the thermal management component.

7. The battery according to claim 1, wherein the thermal management component is configured to be capable of being damaged by the emissions discharged from the battery cell, so that the emissions discharged from the battery cell can pass through the thermal management component.

8. The battery according to claim 1, wherein the thermal management component further comprises:
    an avoidance structure, the avoidance structure being configured to be capable of providing a space allowing the pressure relief mechanism to be actuated; and
    wherein the thermal management component is attached to the battery cell to form an avoidance chamber between the avoidance structure and the pressure relief mechanism.

9. The battery according to claim 8, wherein the avoidance structure comprises a bottom avoidance wall and a side avoidance wall surrounding the avoidance chamber, and the bottom avoidance wall is configured to be damaged when the pressure relief mechanism is actuated, so as to allow the emissions to pass through the thermal management component.

10. The battery according to claim 9, wherein the bottom avoidance wall comprises a partial relief mechanism, and the partial relief mechanism is configured to, when the pressure relief mechanism is actuated, be actuated to allow at least emissions from the battery cell to be discharged through the thermal management component.

11. The battery according to claim 9, wherein the side avoidance wall forms a predetermined angle with respect to the bottom avoidance wall, and the predetermined angle is between 105° and 175°.

12. The battery according to claim 9, wherein the side avoidance wall is configured to be damaged when the pressure relief mechanism is actuated, so that the cooling liquid flows out.

13. The battery according to claim 4, wherein the battery further comprises:
   a collection chamber, the collection chamber being arranged on the other side of the thermal management component with respect to the pressure relief mechanism, and being configured to collect the emissions when the pressure relief mechanism is actuated.

14. The battery according to claim 13, wherein the beam has a hollow space, and the hollow space constitutes the collection chamber.

15. The battery according to claim 13, wherein the support component further comprises an additional collection chamber, and the additional collection chamber and the collection chamber are operably communicated with each other at a lower portion or bottom of the collection chamber.

16. The battery according to claim 13, wherein a diversion structure is arranged in the collection chamber, and the diversion structure is configured to be capable of being favorable for guiding the emissions to a predetermined position.

17. A device, comprising a battery according to claim 1, the battery being configured to provide electric energy.

18. An apparatus for preparing a battery, the apparatus comprising:
   a battery cell preparation module configured to prepare a plurality of battery cells, at least one battery cell of the plurality of battery cells comprising:
      at least two walls, the at least two walls comprising a first wall and a second wall that intersect with each other; and
      a pressure relief mechanism, the pressure relief mechanism being disposed at the first wall, and the pressure relief mechanism being configured to, when an internal pressure or temperature of the battery cell reaches a threshold, be actuated to release the internal pressure;
   a thermal management component preparation module, configured to prepare a thermal management component, the thermal management component being configured to accommodate a cooling liquid flowing in a circulating manner to adjust the temperature of the battery cell, and being configured such that when the pressure relief mechanism is actuated, emissions discharged from the battery cell pass through the thermal management component, the thermal management component is configured to be capable of being damaged by the emissions discharged from the battery cell, so that the cooling liquid flows out from interior of the thermal management component;
   a support component preparation module, configured to prepare a support component, the support component being configured to support the battery cell; and
   an assembly module, configured to attach the thermal management component to the first wall and attach the support component to the second wall.

* * * * *